US006817814B2

(12) United States Patent
Mueller

(10) Patent No.: US 6,817,814 B2
(45) Date of Patent: Nov. 16, 2004

(54) INSCRIBING SYSTEM

(75) Inventor: Michael A. Mueller, Phoenix, AZ (US)

(73) Assignee: The Hillman Group, Inc., Cincinnati, OH (US)

( * ) Notice: Subject to any disclaimer, the term of this patent is extended or adjusted under 35 U.S.C. 154(b) by 83 days.

(21) Appl. No.: 10/254,668

(22) Filed: Sep. 26, 2002

(65) Prior Publication Data

US 2003/0072629 A1 Apr. 17, 2003

Related U.S. Application Data

(63) Continuation of application No. 09/373,507, filed on Aug. 13, 1999, now Pat. No. 6,478,515, which is a continuation-in-part of application No. 09/054,417, filed on Apr. 3, 1998, now Pat. No. 6,186,711.

(51) Int. Cl.[7] .............................. B23C 1/06; B23Q 3/02

(52) U.S. Cl. ........................ 409/132; 409/134; 409/159; 409/167; 409/174; 409/225; 29/DIG. 59; 269/254 R; 269/303; 269/309

(58) Field of Search ............................ 269/73, 309, 13, 269/14, 900, 329, 305, 254 R, 303; 409/134, 80, 84, 131–132, 159, 167, 174, 225; 29/DIG. 56, DIG. 59, DIG. 60; 483/3; 74/608–609; 33/18.1; 312/321.5; 198/345.2, 345.3, 346.1

(56) References Cited

U.S. PATENT DOCUMENTS

| | | | | | |
|---|---|---|---|---|---|
| 2,034,240 | A | * | 3/1936 | Kremer et al. | 409/93 |
| 2,142,034 | A | * | 12/1938 | Patrick | 269/170 |
| 2,182,551 | A | * | 12/1939 | Edwards | 409/197 |
| 2,646,725 | A | * | 7/1953 | Bryníldsrud | 409/109 |
| 2,801,555 | A | * | 8/1957 | Freeland et al. | 29/243.54 |
| 4,223,482 | A | * | 9/1980 | Barroero et al. | 312/321.5 |
| 4,254,552 | A | * | 3/1981 | Samis | 33/18.1 |
| 4,437,150 | A | * | 3/1984 | Dahlgren et al. | 700/180 |

(List continued on next page.)

FOREIGN PATENT DOCUMENTS

| | | | | |
|---|---|---|---|---|
| JP | 2000-141990 | A | * | 5/2000 |
| JP | 2000-168295 | A | * | 6/2000 |
| WO | WO-93/20522 | | * | 10/1993 |

OTHER PUBLICATIONS

JSI Engraving Machine brochure, Jupiter Sports Inc., 1page, from: http://www.jupitersports.net/Products/Catalog/Products/flash/productsjsisyst.html.

Engraving Accessories Catalog, Western Engravers Supply, Inc., 8 pages.

*Primary Examiner*—Erica Cadugan
(74) *Attorney, Agent, or Firm*—Finnegan, Henderson, Farabow, Garrett & Dunner, LLP

(57) ABSTRACT

A system and method for inscribing an item is provided. The system includes a housing having a door, an inscriber, and a support. The inscriber is disposed in the housing and is operable to inscribe the surface of an item secured in an item carrier. The support has a positioning structure that is configured to engage the item carrier and establish a reference point so that the location of the surface of the item with respect to the support is determinable. The support moves between a loading position and an inscribing position to position the item for inscribing. There is also provided a controller that governs the movements of the inscriber and includes an input device. The input device is moveable between a first position to receive characteristics about the item to be inscribed and a second position to receive a message to be inscribed on the surface of the item. There is further provided an item carrier that is configured to securely hold an item to be inscribed and includes a second positioning structure. The second positioning structure is engageable with the first positioning structure of the inscribing device to position the item carrier and item on the support of the inscribing device so that an inscription inscribed on the item will be correctly orientated on the item.

20 Claims, 19 Drawing Sheets

U.S. PATENT DOCUMENTS 4,512,068 A * 4/1985 Piotrowski .................. 29/33 P
4,645,391 A * 2/1987 Fallert ........................ 409/225
4,664,366 A * 5/1987 Lane et al. ................. 269/303
4,688,974 A * 8/1987 Wright et al. ............... 409/219
4,794,687 A * 1/1989 Peters et al. .................. 29/559
4,834,595 A * 5/1989 Cacciotti ..................... 409/80
4,928,939 A * 5/1990 Bell et al. ................... 269/309
4,938,334 A * 7/1990 McGinn .................. 198/346.1
4,993,895 A * 2/1991 Nordstrom .................. 408/103
4,999,895 A * 3/1991 Hirose et al. ............... 29/33 P
5,020,201 A * 6/1991 Kitamura .................... 29/27 C
5,056,391 A * 10/1991 Stewart ....................... 83/139
5,064,321 A * 11/1991 Barnes ....................... 409/219
5,065,991 A * 11/1991 Schneider ................... 269/309
5,116,174 A * 5/1992 Fried et al. ................... 409/79
5,158,487 A * 10/1992 Varnau ....................... 29/33 P
5,302,061 A * 4/1994 Terawaki et al. ........... 409/134
5,381,457 A * 1/1995 Burns ......................... 378/166
5,403,131 A * 4/1995 Susnjara ..................... 409/131
5,415,384 A * 5/1995 Obrist et al. ................ 269/309
5,429,461 A * 7/1995 Mukherjee et al. ......... 409/163
5,531,004 A * 7/1996 Ahn ........................... 29/33 P
5,569,003 A * 10/1996 Goldman et al. ........... 409/132
5,575,318 A * 11/1996 Susnjara ..................... 144/2.1
5,593,040 A * 1/1997 Shelton et al. .............. 206/706
5,611,650 A * 3/1997 Perkins et al. ................ 408/87
5,623,754 A * 4/1997 Swann et al. .............. 29/281.1
D381,682 S * 7/1997 Bornhorst et al. ........... D18/57
5,653,038 A * 8/1997 Hunter ........................ 33/573
5,743,685 A * 4/1998 Piggott ....................... 409/131
5,764,223 A * 6/1998 Chang et al. ............... 345/175
5,788,435 A * 8/1998 McCarthy ................... 409/187
5,897,275 A * 4/1999 Sella .......................... 409/164
5,918,870 A * 7/1999 Stark .......................... 269/309
5,961,261 A * 10/1999 Stark .......................... 409/219
6,059,495 A * 5/2000 Mueller et al. ............. 409/197
6,067,877 A * 5/2000 Kato ........................... 74/608
6,085,126 A * 7/2000 Mellgren et al. ........... 700/233
6,094,793 A * 8/2000 Szuba ........................ 29/33 P
6,139,002 A * 10/2000 Stark .......................... 269/309
6,161,826 A * 12/2000 Forrer ........................ 269/309
6,186,711 B1 * 2/2001 Mueller ...................... 409/132
6,321,430 B1 * 11/2001 Goldman et al. ........... 29/33 P
6,478,515 B1 * 11/2002 Mueller ...................... 409/132
6,527,266 B1 * 3/2003 Yonezawa et al. .......... 269/309
6,668,210 B1 * 12/2003 Kim et al. .................. 700/235
2003/0071407 A1 * 4/2003 Haruna ....................... 269/309

* cited by examiner

INSCRIBING SYSTEM

RELATED APPLICATIONS

This is a continuation of application Ser. No. 09/373,507, now U.S. Pat. No. 6,478,515 filed Aug. 13, 1999, which is a continuation-in-part of application Ser. No. 09/054,417 now U.S. Pat. No. 6,186,711, filed Apr. 3, 1998, all of which are incorporated herein by reference.

BACKGROUND OF THE INVENTION

The present invention relates generally to a device for personalizing items. More particularly, the invention relates to a system and method for inscribing an item.

There is a significant consumer demand to purchase items that have a personalized inscription. Apparently, consumers enjoy having the opportunity to purchase a particular item and have the item personalized with an inscription for either themselves or another individual. There is particularly a demand for personal items such as key chains, bracelets, business card holders, money clips, pens, etc., that are marked with a person's name or initials or that include a personal message or design.

To meet this demand, a store must maintain a machine that is capable of inscribing any one of a variety of items, as well as a broad inventory of such items. There are many different machines that are capable of inscribing personal items. For example, the store may own and operate either an engraving machine or a printing machine to perform this function.

However, there are several problems with the currently available inscribing machines. Engraving machines, in particular, are typically very complex machines that require a skilled employee to operate efficiently. To efficiently operate an engraving machine, the employee must be skilled in both positioning the item and in performing the engraving.

Positioning the item for engraving requires skill to ensure that the item is aligned correctly under the engraver and that the item is firmly clamped into place so that the item will not move while it is being engraved. If the item shifts during the engraving operation or if the item is improperly aligned, the item will likely be ruined and the operator would be forced to start over with a new item. Even with training, positioning an item for engraving is a skill that must be learned through time-consuming trial and error, which can become costly for the store.

Another potential problem with engraving machines is that the machines typically leave the moving parts of the engraver exposed so that the operator can monitor the engraving operation to ensure the item is aligned correctly and that the item is properly engraved. However, since the moving parts of the machine are exposed, loose clothing or appendages may catch on the moving parts, which may result in injury to either an operator or a customer. This is particularly a problem with engraving machines that use a milling engraver to inscribe an item. The tip of a milling engraver spins as it contacts the surface of the item and tends to throw pieces of the material during the engraving process. These pieces of material could potentially strike and injure an operator or customer. Thus, these machines present a potential safety hazard, particularly if the machine is positioned in area of the store that is easily accessible to customers.

An additional problem with existing inscribing machines is that a customer must tell an operator the message that is to be inscribed on the item. Communication of the content of the desired inscription can be difficult if the operator and customer speak different languages or if the customer has an accent. Obviously, if the operator does not understand the content of the message, the resulting inscription will be incorrect and the operator will be forced to start over with a new item.

Some inscribing machines are available that operate in a manner similar to vending machines. These machines require no engraving experience to operate and may, therefore, be operated directly by the consumer without the assistance of a skilled operator. However, these machines are very large and take up a great deal of floor space, which makes them impractical to operate in small jewelry and variety stores. In addition, the variety of items available for selection are limited, since the machines must be specifically configured to handle each differently shaped item.

In light of the foregoing, there is a need for a system for inscribing an item that is compact, easy to use, safe, and that reduces the likelihood of a communication error in communicating the content of the inscription.

SUMMARY OF THE INVENTION

Accordingly, the present invention is directed to a system for inscribing an item that substantially obviates one of more of the limitations and disadvantages of prior art inscribing machines. The advantages and purposes of the invention will be set forth in part in the description which follows, and in part will be obvious from the description, or may be learned by practice of the invention. The advantages and purposes of the invention will be realized and attained by the elements and combinations particularly pointed out in the appended claims.

To attain the advantages and in accordance with the purposes of the invention, as embodied and broadly described herein, the present invention is directed to a system for inscribing an item that has a surface and is secured in an item carrier. The system includes a housing having a door. An inscriber is provided in the housing that is operable to inscribe the surface of the item. There is also provided a support having a positioning structure that is engageable with the item carrier and is configured to establish a reference point so that the location of the item carrier with respect to the support is determinable when the item carrier is engaged with the positioning structure. The support is moveable between a loading position where the support extends through the door of the housing thereby exposing the positioning structure and an inscribing position where the item is positioned for inscribing and the inscriber is fully enclosed by the housing.

In another aspect, the invention is directed to a method of inscribing an item. In the method, an inscribing device including a housing, a controller, an inscriber, and a support having a first positioning fixture is provided. An item to be inscribed is secured in an item carrier having a second positioning structure. The second positioning structure of the item carrier is engaged with the first positioning structure to secure the item carrier and the item to be inscribed to the support. Information, including the characteristics of the item to be inscribed and the content of the inscription, is input into the controller. The surface of the item is inscribed based on the information input into the controller.

In yet another aspect, the present invention is directed to a system for inscribing an item. The system includes a controller that has an input device. The input device is moveable between a first position to receive characteristics about the item to be inscribed and a second position to receive a message to be inscribed on the surface of the item. The controller governs the movements of the inscriber to inscribe the message on the surface of the item.

In still another aspect, the present invention is directed to an item carrier for an inscribing device that has an inscriber and a support with a first positioning structure. The item carrier includes a body that has a fixture configured to secure an item to be inscribed to the item carrier body. The fixture engages the item such that at least a portion of the surface of the item is exposed for inscribing. The item carrier also includes a second positioning structure that is engageable with the first positioning structure of the inscribing device to position the item carrier and item on the support of the inscribing device so that an inscription inscribed on the item will be correctly orientated on the item.

According to still another aspect, the present invention is directed to a system for inscribing an item. The system includes an inscribing module and a control module. The inscribing module includes a housing that has a door, an inscriber that is disposed in the housing and is operable to inscribe the surface of the item, and a support that has a positioning structure configured to position the item with respect to the inscriber and is moveable between a loading position where the support extends through the door of the housing to expose the positioning structure and an inscribing position where the item is positioned for inscribing. The control module includes a controller that governs the movements of the inscriber to inscribe the message on the surface of the item. The second module is connected to the first module such that the modules may be placed in physically separate locations.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate one embodiment of the invention and together with the description, serve to explain the principles of the invention. In the drawings.

DETAILED DESCRIPTION

Reference will now be made in detail to the present preferred embodiment of the invention, an example of which is illustrated in the accompanying drawings. Wherever possible, the same reference numbers will be used throughout the drawings to refer to the same or like parts.

In accordance with the present invention, there is provided a system for inscribing an item. For purposes of this disclosure, the term "item" is intended to include any products or goods that are or may be sold with a personalized inscription. Examples of such items include, but are not limited to, jewelry, key chains, business card holders, pens, money clips, name plates, plaques, trophies, and awards. An exemplary embodiment of the inscribing system of the present invention is illustrated in FIG. 1 and is generally designated by reference number 100.

Figure 1:
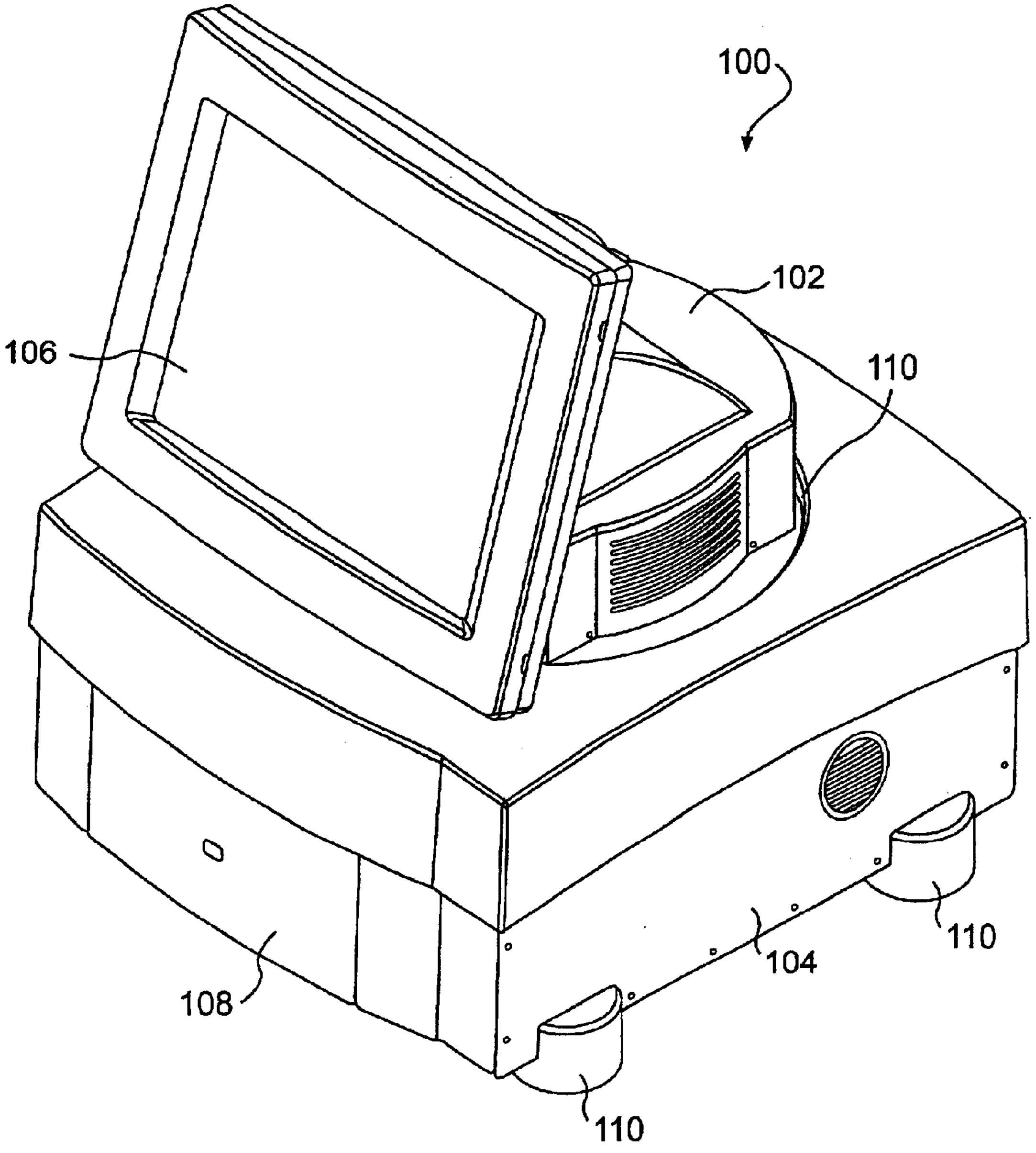
FIG. 1 is a perspective view of a system for inscribing an item according to the present invention.

As illustrated in FIG. 1, inscribing system 100 includes a controller 102 mounted on a housing 104. Preferably, housing 104 is made of a solid construction and completely encloses the moving components of inscribing system 100, which will be described in greater detail below. In the illustrated embodiment, inscribing system 100 is compactly sized so that the system may be placed on a supporting surface such as the top of a standard store counter or another location that provides easy access to the inscribing system.

Figure 2:
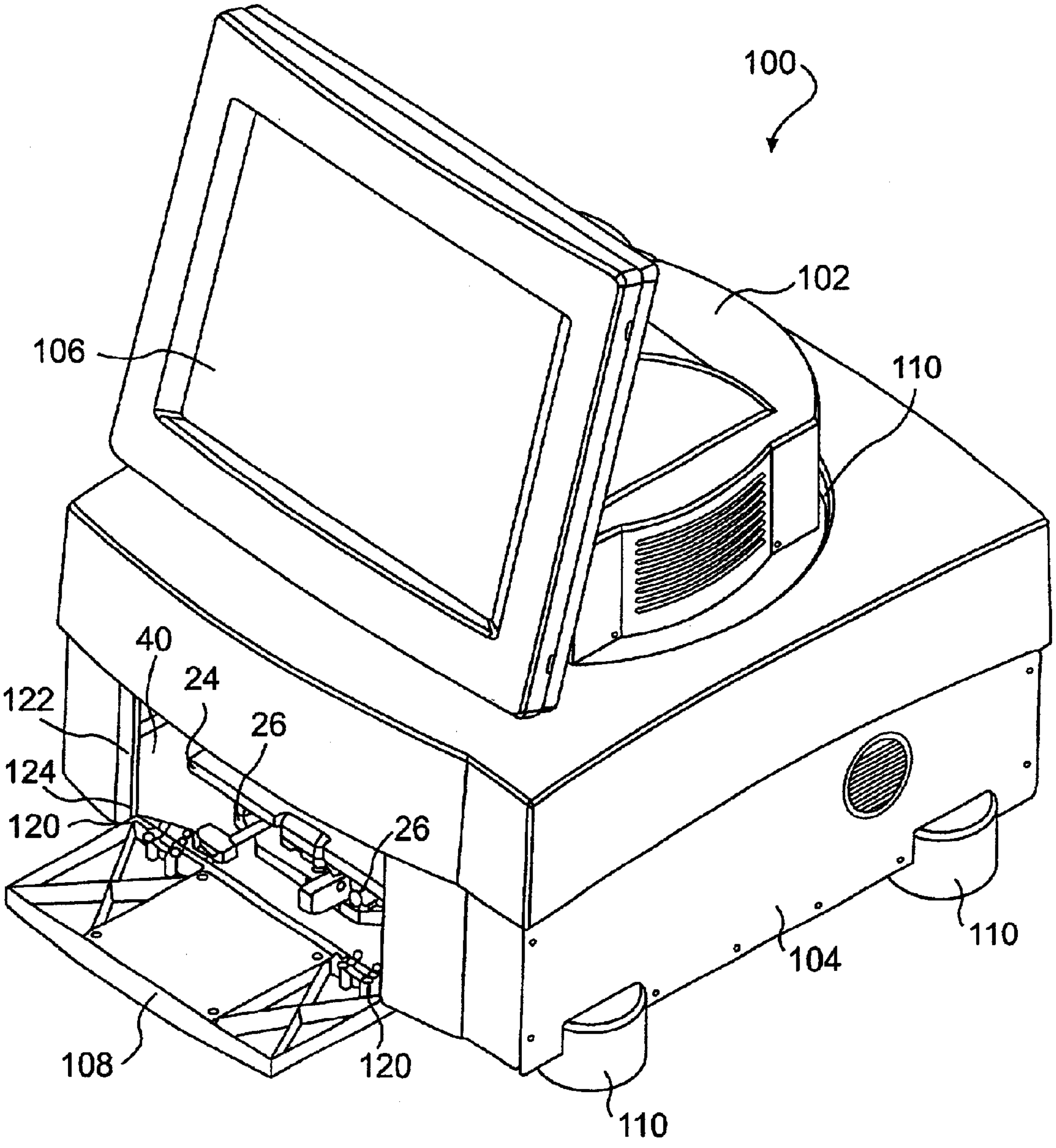
FIG. 2 is a perspective view of a system for inscribing an item, illustrating a pivoting door in the open position.

As illustrated in FIG. 2, housing 104 includes a door 108 and is supported by feet 110. Door 108 is mounted on hinges 120 that are preferably located on the lower edge of housing 104. Feet 110 elevate housing 104 above the supporting surface so that door 108 may pivot on hinges 120 and, when opened, will lie flat on the supporting surface and create an opening 122 in the front of housing 104.

In accordance with the present invention, housing 104 contains an inscriber. In the disclosed embodiment, the preferred inscriber is an engraver 12, however the present invention contemplates that the inscriber may be a printer or any other instrument capable of writing, printing, or engraving text or figures onto the surface of an item. The preferred engraver is a scribe engraver, although any type of engraver known in the art, such as, for example, a milling engraver, may be used.

Figure 3:
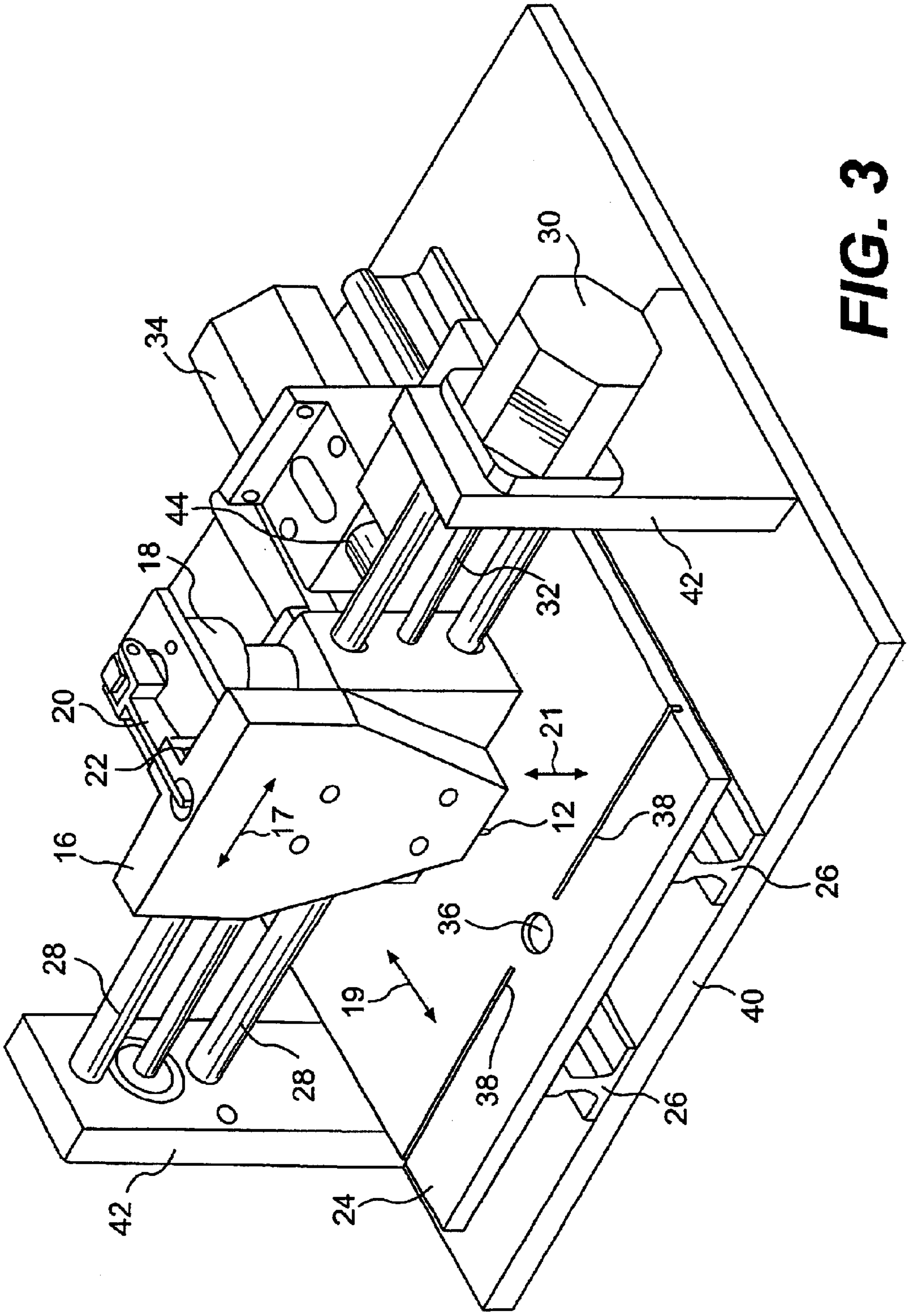
FIG. 3 is a perspective view of an inscriber according to the present invention.

As illustrated in FIG. 3, engraver 12 is mounted on a support structure that provides for movement of-the engraver in two dimensions, referred to as the X- and Z-directions. The present invention contemplates, however, that the support structure may additionally provide for motion of the engraver in the third, or Y-direction.

The support structure for engraver 12 includes a housing 16. Housing 16 is, in turn, mounted on two guides 28. The guides 28 are supported by two vertical support members 42 that rest on a bottom plate 40 of system housing 104.

Movement in the X-direction (as indicated by arrow 17 in FIG. 3) is controlled by a first stepper motor 30 that is mounted on one of the support members 42. First stepper motor 30 is connected to a lead screw 32, which engages housing 16. First stepper motor 30 turns lead screw 32, thereby causing housing 16 and engraver 12 to move along guides 28 in the X-direction. As is described in greater detail below, the amount of X-direction movement generated by first stepper motor 30 is governed by controller 102.

Movement in the Z-direction (as indicated by arrow 21 in FIG. 3) is controlled by a second stepper motor 18 that is mounted on housing 16. As best shown in FIG. 3, engraver 12 is connected to a shaft that is slidably disposed in housing 16. Second stepper motor 18 is connected to the engraver shaft by a lever arm 20 that has a pivot point 22. Second stepper motor 18 acts on lever arm 20 to move the lever arm about the pivot point 22, which results in movement of the shaft and engraver 12 in the Z-direction. As is described in greater detail below, the amount of Z-direction movement generated by second stepper motor 18 is governed by controller 102.

The present invention contemplates that other devices for moving the engraver in the Z-direction will be readily apparent to those skilled in the art. For example, the stepper motor may be replaced by any other instrument for effecting a controlled linear movement. In addition, a stepper motor or similar device that produces a controlled rotational movement may be combined with a rack and pinion system to move the engraver in the Z-direction.

In accordance with the present invention, the inscribing system includes a support having a positioning structure that is configured to position an item to be inscribed. In the presently preferred embodiment and as illustrated in the figures, the support is an engraving table 24 that is configured for movement in the Y-direction (as indicated by arrow 19 in FIG. 3) with respect to the inscriber.

Figure 4:
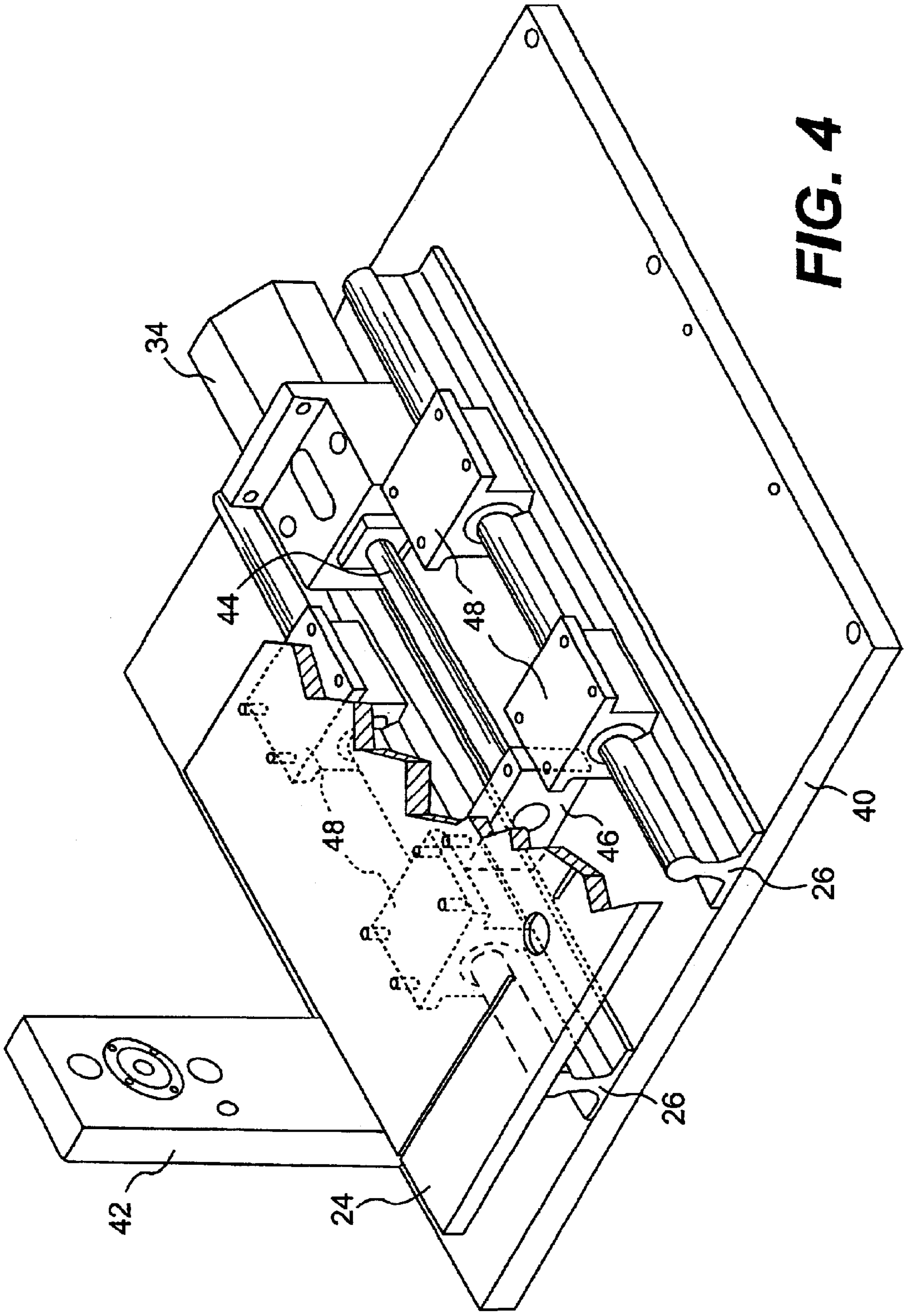
FIG. 4 is a cut-away view of the inscriber of FIG. 3, illustrating a support for the inscribing system in accordance with the present invention.

As shown in FIG. 3, engraving table 24 is positioned beneath engraver 12 and between vertical support members 42. As shown in FIG. 4, engraving table 24 has four sliding supports 48 that are slidably engaged with two support rails 26. Support rails 26 rest on bottom plate 40 of system housing 104.

As illustrated in FIG. 4, movement in the Y-direction (as indicated by arrow 19 in FIG. 3) is controlled by a third stepper motor 34. Third-stepper motor 34 is connected to a lead screw 44 that is engaged with a threaded structure 46 on engraving table 24. Lead screw 44 is turned by third stepper motor 34. Lead screw 44 acts on engraving table 24 through structure 46 to move engraving table 24 along the support rails 26 in the Y-direction with respect to engraver 12. As is described in greater detail below, the amount of Y-direction movement generated by third stepper motor 34 is governed by controller 102.

Figure 5:
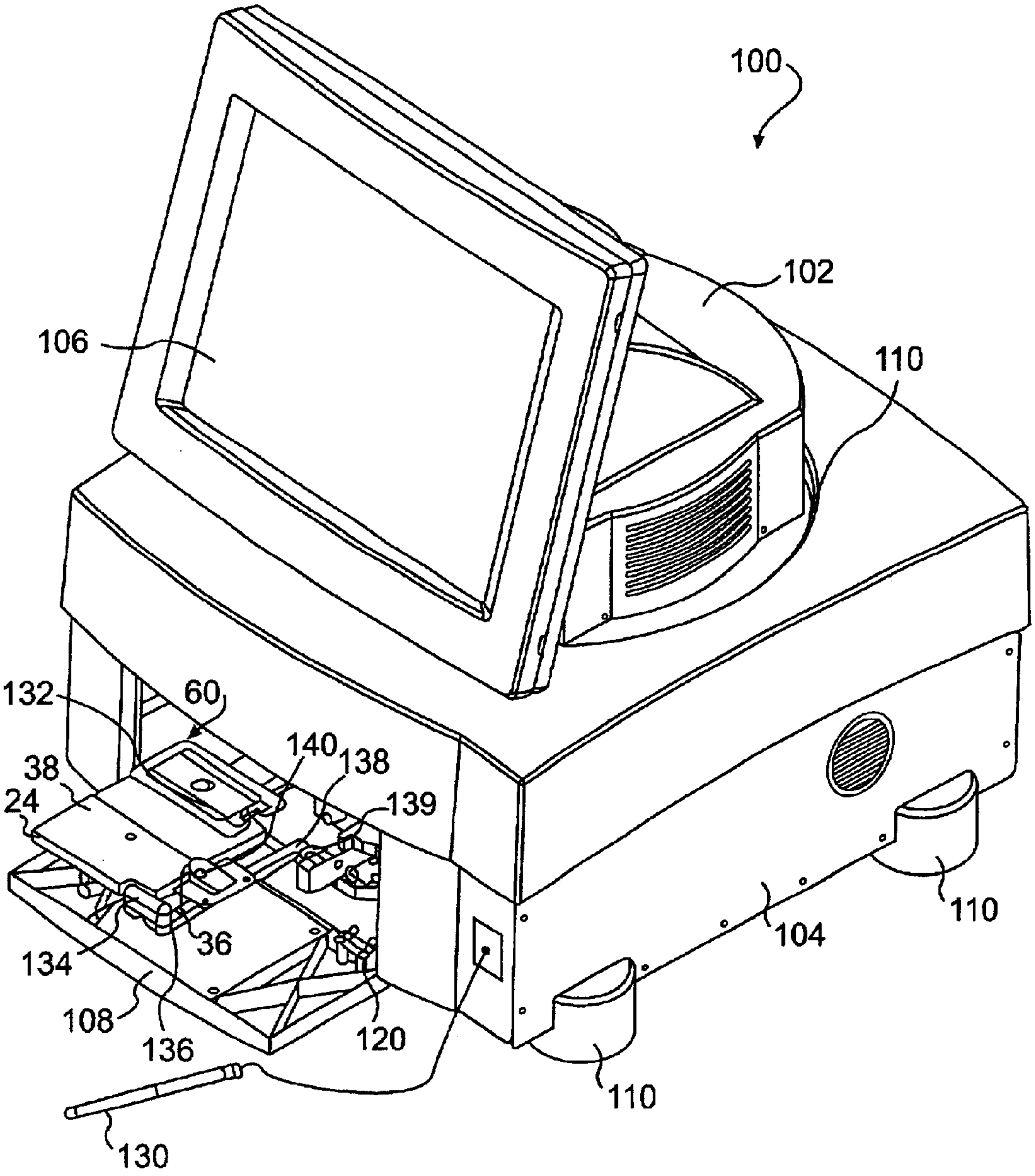
FIG. 5 is a perspective view of an inscribing system of the present invention, illustrating a support in a loading position.

As illustrated in FIG. 2, engraving table 24 is positioned adjacent door 108 in housing 104. Engraving table 24 has a width that is smaller than the width of opening 122 created by opening door 108. Third stepper motor 34 may be activated to move engraving table 24 through opening 122. Preferably door 108 is spring-loaded so that the door is biased into a closed position. The movement of engraving table 24 forces door 108 open as the engraving table moves into a loading position, as illustrated in FIG. 5. It is contemplated that the orientation of the engraving table 24 and door within housing 104 may vary.

As described above, housing 104 completely encloses the inscribing components of system 100. In the embodiment illustrated in FIG. 2, a contact switch 124 is positioned adjacent door 108 to determine if the door is open or closed. Preferably, contact switch 124 is connected to controller 102 and controller 102 will not initiate the inscribing process until door 108 is closed. In this manner, the inscribing system ensures that the moving components are completely enclosed prior to starting the inscribing operation. This improves the safety of the system by reducing the likelihood that loose clothing or an appendage will be caught by the moving parts of the machine and result in an injury to either an operator or a customer. This safety feature is particularly important in the consumer retail environment for which this system is intended.

Figure 6:
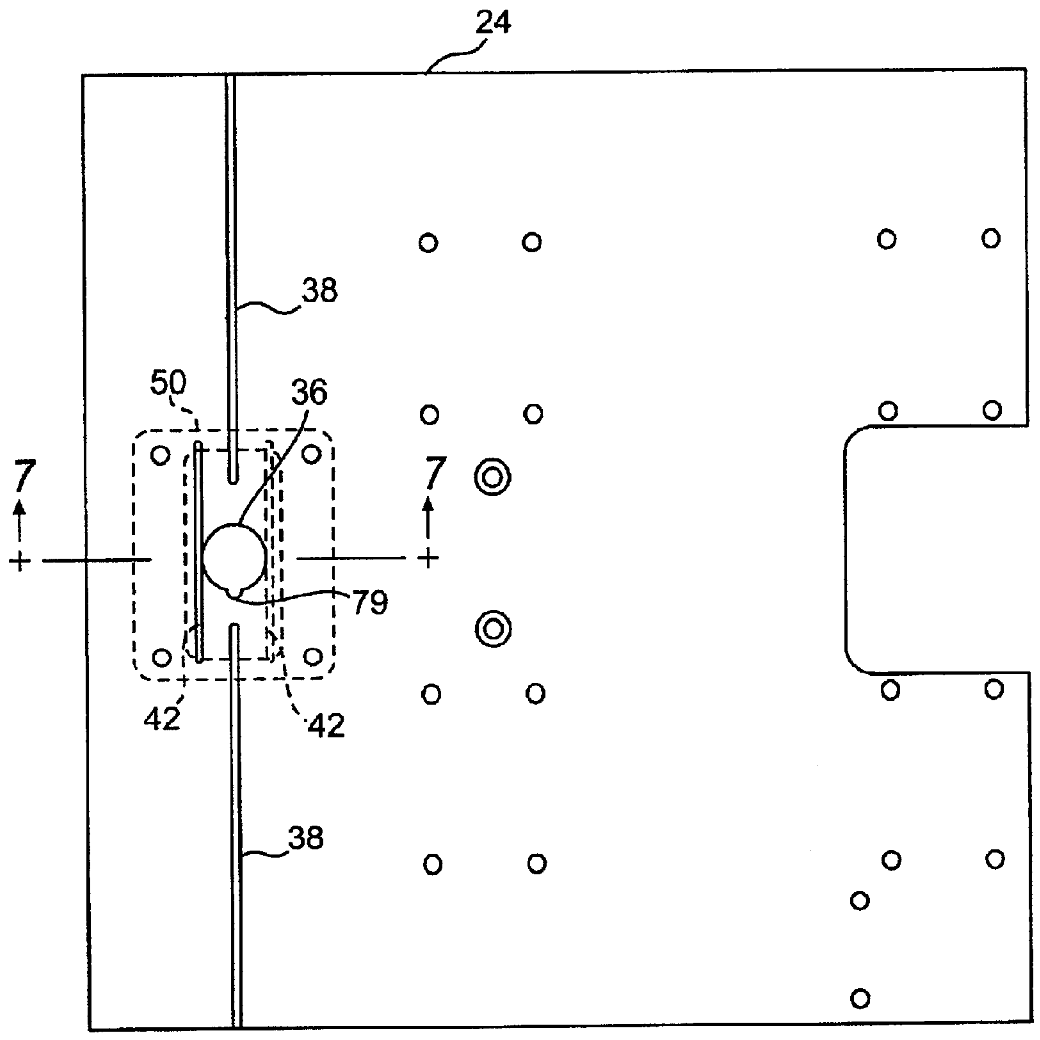
FIG. 6 is top view of a support according to the present invention.
Figure 7:
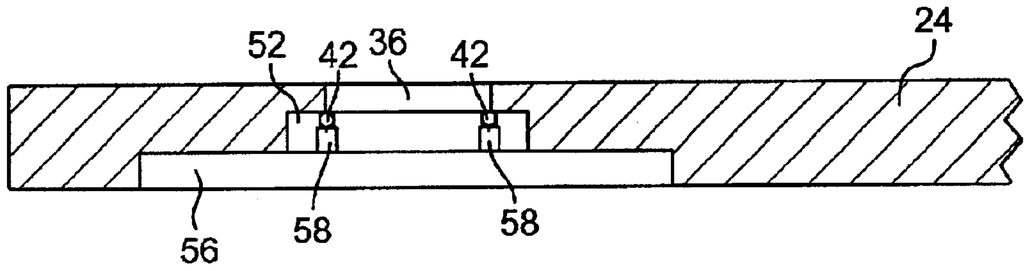
FIG. 7 is a cross-sectional view of the support of FIG. 6, taken along line A-A.

In accordance with the present invention, the support of the inscribing system includes a first positioning structure that is engageable with the item and is configured to establish a reference point so that the location of the surface of the item with respect to the support is determinable when the item is engaged with the positioning structure. As best illustrated in FIG. 6, the first positioning structure of engraving table 24 of the exemplary embodiment comprises a circular opening 36. As shown in FIG. 7, the opening 36 extends through engraving table 24.

As best illustrated in FIG. 6, spring pins 42 are mounted within engraving table 24 and intersect opening 36. As shown in FIG. 4, spring pins 42 are positioned in vertical slots 58. An open area 52 is provided around the spring pins 42 into which the spring pins may deflect in response to contact with an object.

In accordance with the present invention, the engraving system includes an item carrier for holding an item to be inscribed. The item carrier has a second positioning structure that engages the first positioning structure on the support of the inscribing system to position the item in a predetermined inscribing position.

In the presently preferred and disclosed embodiment, the second positioning structure is a boss that is centered on the item carrier. The central location of the boss ensures that when the boss is engaged with the opening, the item carrier will be centered over the opening. If the item is similarly centered on the item carrier, then the item will also be centered over the opening in the support. In this manner, the item carrier may be positioned on the support independently of the shape of the item.

Thus, the engagement of these positioning structures establishes the center of the opening as a reference point from which the controller may determine the location of the item carrier on the support. Because the dimensions of the item and item carrier and the location of the item with respect to the item carrier are known to the controller, or may be input into the controller, the location of the inscribing area of the particular item may be determined from the established reference point. The present invention, therefore, provides a positioning system wherein the placement of the item carrier on the support automatically positions the item in position for inscribing. This positioning is achieved by simply engaging the first positioning structure with the second positioning structure, an act which requires no special skill or training. Thus, this aspect of the present invention significantly reduces the complexity of the inscribing process.

Figure 9:
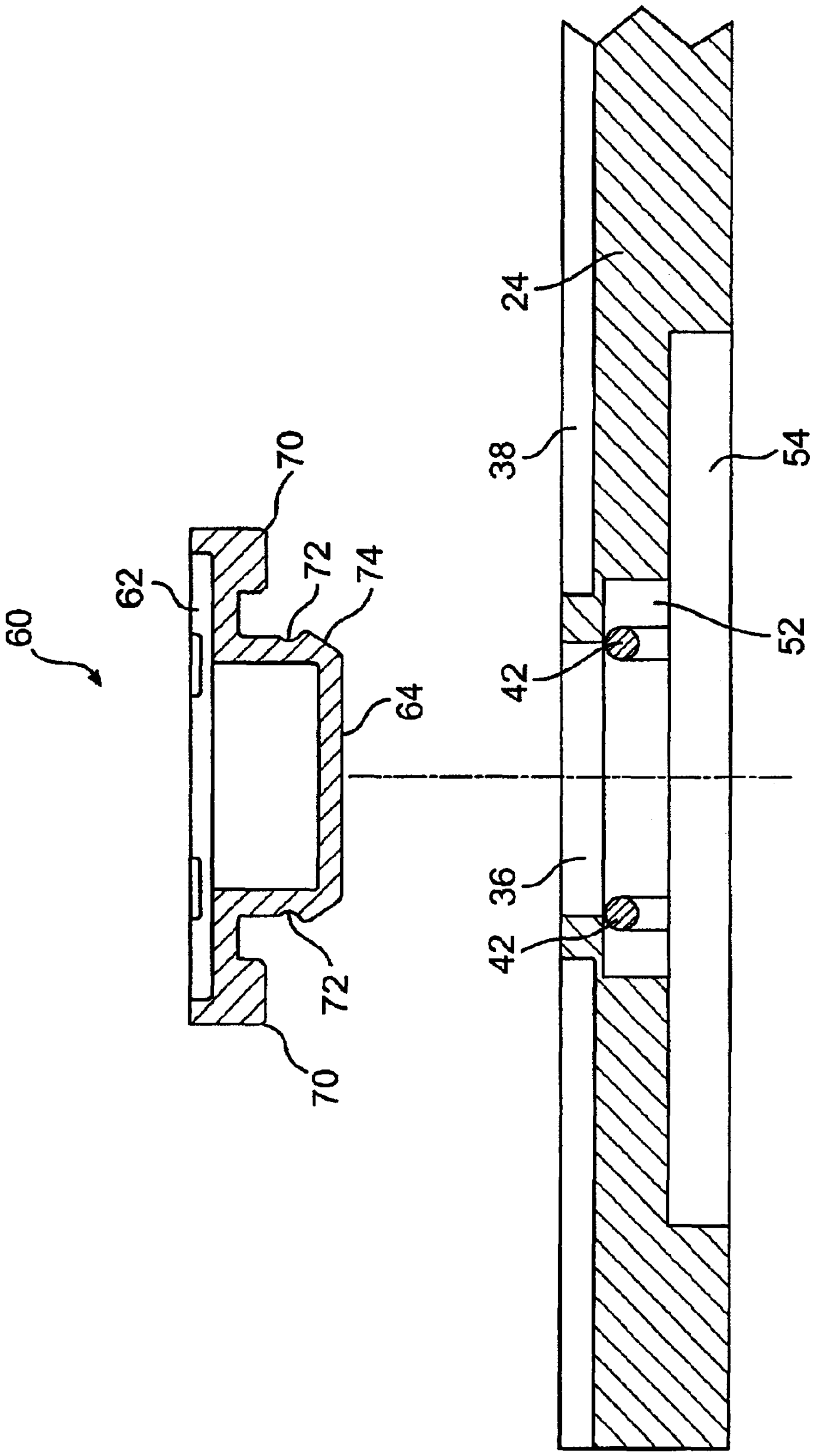
FIG. 9 is a cross-sectional view of an item carrier positioned above a support.

As shown in FIG. 9, item carrier 60 has a boss 64 that projects outwardly from the item carrier. An edge 74 of boss 64 is preferably beveled to ease the engagement of the boss with the opening 36 in the engraving table 24. The boss 64 and opening 36 have substantially the same size and shape.

Figure 13:
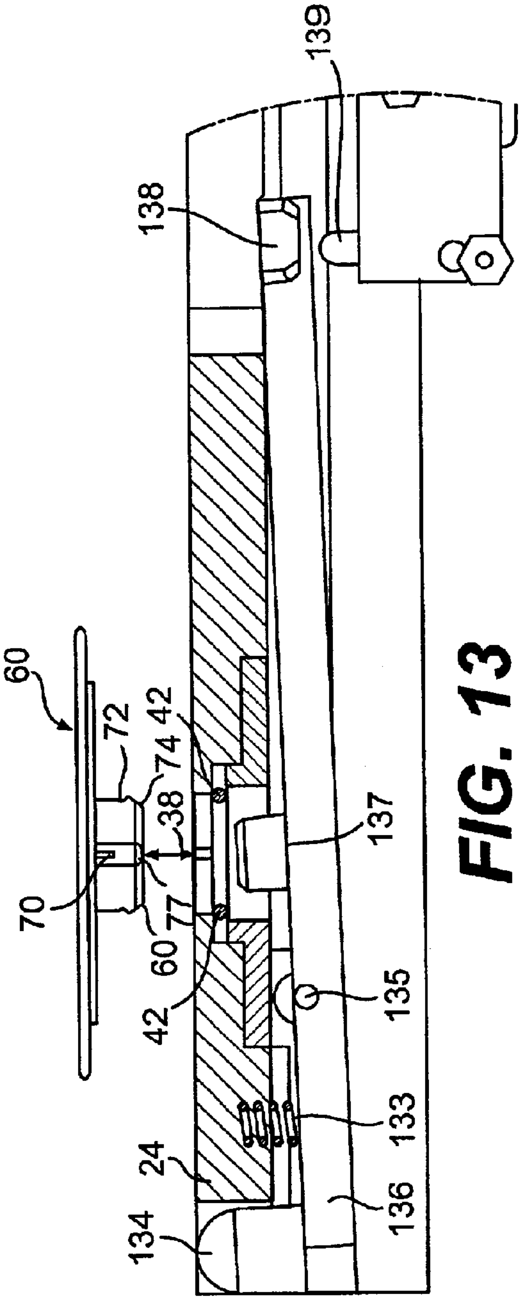
FIG. 13 is a sectional view of an item carrier and support according to the present invention.
Figure 14:
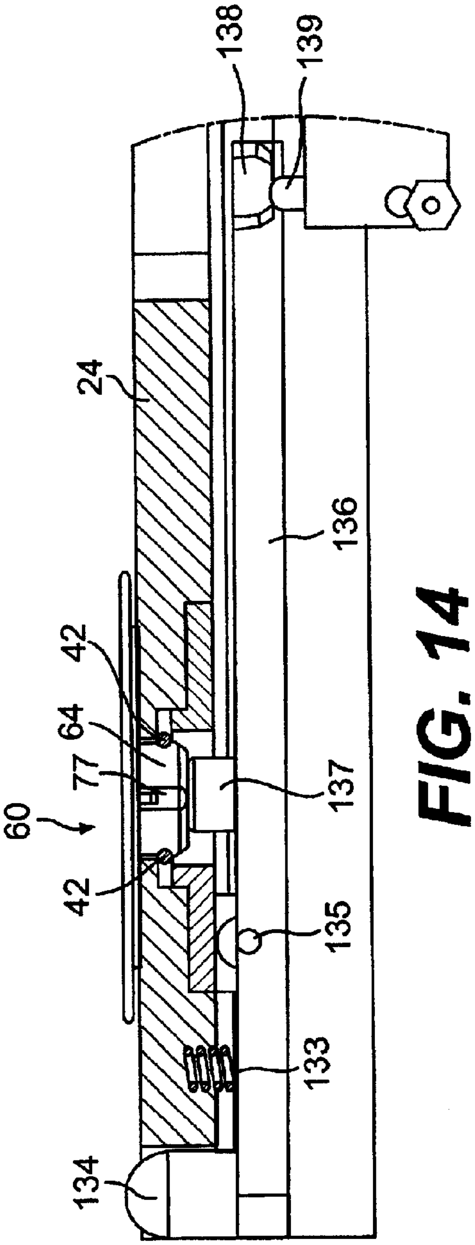
FIG. 14 is a sectional view of an item carrier and a support according to the present invention, illustrating the item carrier secured to the support.

Preferably, as shown in FIGS. 13 and 14, boss 64 includes a ridge 77. Ridge 77 extends outwardly from the edge of boss 64. Opening 36 includes a recess 79 (referring to FIG. 6) configured to receive ridge 77. The engagement of ridge 77 and recess 79 ensures that the item carrier and associated item are properly orientated on the engraving table. Without the ridge and recess, it is possible that the item carrier could be secured to the engraving table in a position that is rotated 180° from the proper orientation.

Figure 10:
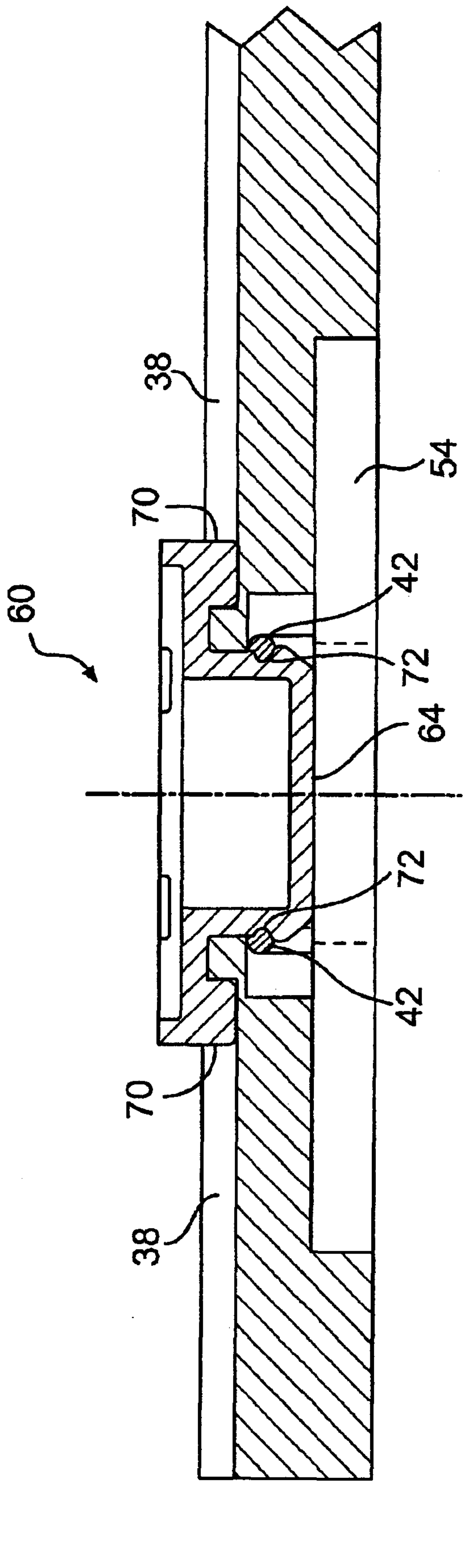
FIG. 10 is a cross-sectional view of the item carrier in position on the support.

As also shown in FIG. 9, there are a pair of indentations 72 on either side of boss 64. Indentations 72 are rounded and are positioned to engage spring pins 42 in engraving table 24 when boss 64 engages opening 36. As shown in FIG. 10, when the item carrier 60 is in position on engraving table 24, spring pins 42 engage indentations 72 and secure the item carrier to the engraving table.

While the disclosed embodiment of the positioning structure provides a singular boss having a circular cross section to engage the opening in the engraving table in order to position the item, it is contemplated that many other configurations could perform the same function. For example, the item carrier could have a boss with a polygonal cross section, as illustrated in FIG. 11*d*. Alternatively, the item carrier could have multiple bosses that engage corresponding openings in the engraving table. Or, the item carrier could have intersecting protrusions which mate with intersecting slots on the engraving table, where the intersection of the protrusions establishes a reference point to determine the location of the item carrier.

It is further contemplated that the second positioning structure on the item carrier may not be centered with respect to the item and that the engagement of the first and second positioning structures may not physically center the item with respect to positioning structure in the support. The positioning structure on the item carrier and the engagement of the first and second positioning structures may be accomplished in any of a variety of manners, provided that the engagement of the first and second positioning structures consistently establishes a predefined reference point from which the controller may locate the inscribing surface of the particular item. Accordingly, any number of different positioning structures can be developed and are considered to be within the scope of the present invention.

Figure 8:
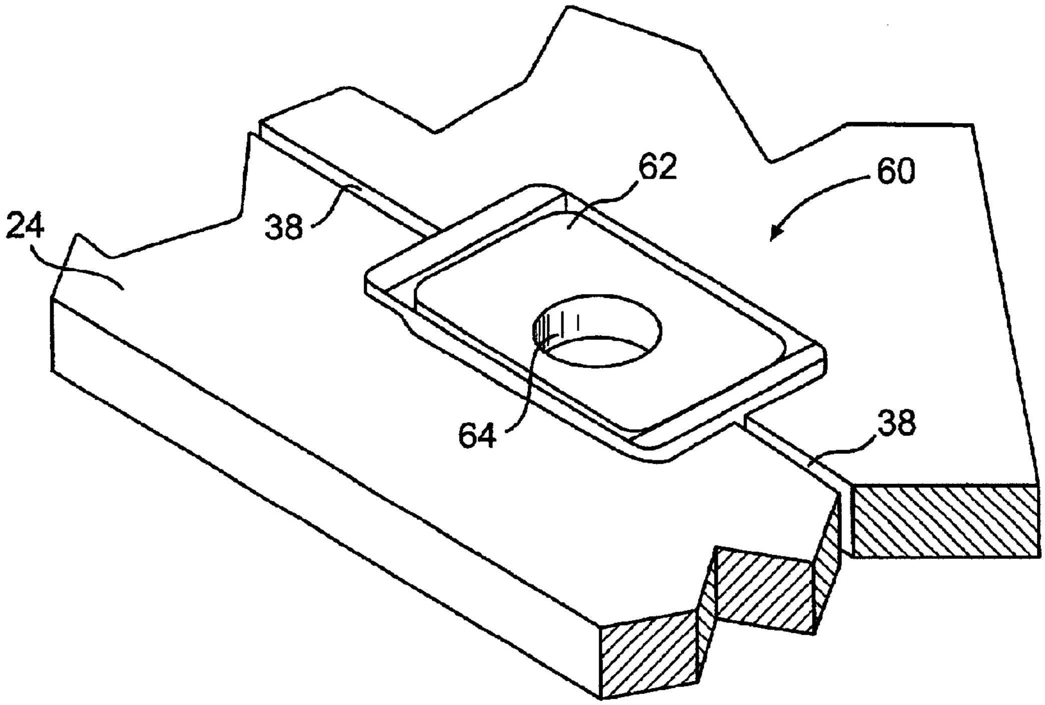
FIG. 8 is a partial perspective view of an item carrier in position on a support, in accordance with the present invention.

In accordance with the present invention, the item carrier includes a fixture configured to securely hold an item for inscribing. In the presently preferred embodiment and as shown in FIG. 8, the fixture of item carrier 60 is a relief 62 that is configured to securely hold an item. The fixture of this invention is not limited to a relief or any particular securing mechanism. The present invention contemplates numerous fixtures, including an arrangement wherein the fixture is above the surface of the item carrier.

The present invention preferably provides a series of item carriers to carry a wide assortment of items. The depth, width and length of relief 62 in each item carrier 60 is dependent on the particular item to be held therein. Each relief 62 has substantially the same shape as the item held therein so that the item is securely fixed to the item carrier so that the item will not move with respect to the item carrier during the inscribing process. Each item carrier 60 secures the item within the relief such that at least a portion of the surface of the item is exposed for inscribing.

Figure 11A:
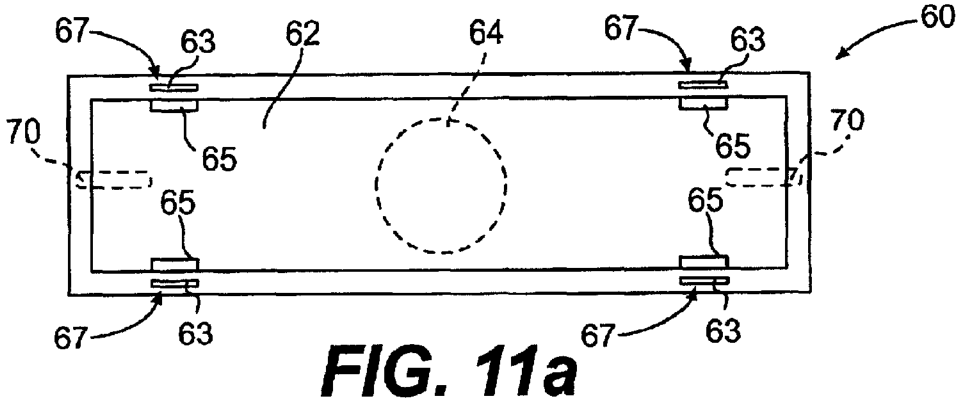
FIGS. 11(*a*)–11(*d*) are top views of alternative embodiments of the item carrier of the present invention.
Figure 11B:
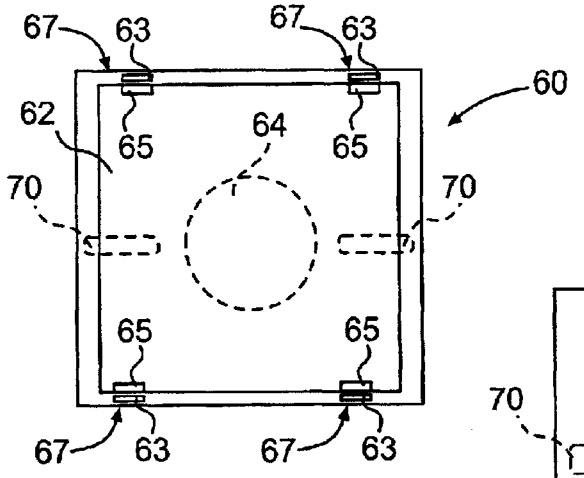
Figure 11C:
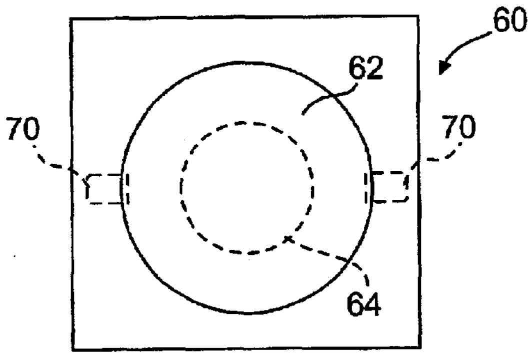
Figure 11D:
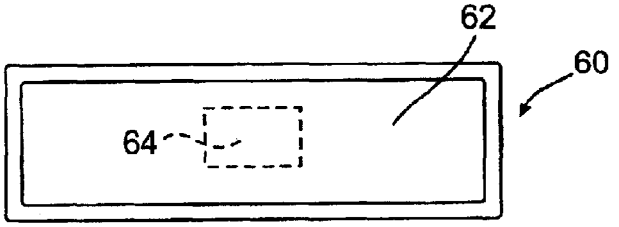

As shown in FIGS. 11*a*, 11*b*, 11*c*, the outer dimensions of the item carrier 60 may be of any shape befitting the shape of the item. For example, in FIG. 11*a* the item carrier holds a rectangular item, such as a name plate. The item carriers of FIGS. 11*b* and 11*c* are configured to hold square and circular items, respectively.

Preferably, an adhesive is used to secure an item within relief 62. The adhesive may be placed in the bottom of the relief or along the sides of the relief to attach to the item. It is contemplated that any adhesive such as, for example, two-sided tape or glue may be used. The preferred adhesive will firmly attach the item to the relief, but will allow the item to be removed from the item carrier without incurring any damage to the item.

Alternatively, as shown in FIGS. 11*a* and 11*b*, item carrier may include snap locks 67 to further secure an item within relief 62. Snap locks 67 are positioned around the perimeter of relief 62. The present invention contemplates that a variety of patterns of snap lock placements or other fastening mechanisms will be readily apparent as capable of securing an item within relief 62.

Each snap lock 67 includes a tab 65. Each tab 65 projects into relief 62 to engage an item that is inserted into the relief. Preferably, tab 65 engages the side of an item to exert a lateral force on the item. The combined forces of a series of snap locks will securely hold the item and prevent the item from shifting during the inscription operation. Alternatively, relief 62 could be configured such that tab 65 extends over the surface of the item to secure the item within the relief.

Each snap lock 67 also includes an opening 63 that is formed in item carrier 60 adjacent tab 65. Opening 63 provides an area into which the item carrier material may flex when an item is inserted into relief 62. Preferably, item carrier 60 is made of a flexible material with a high resiliency so that the material between opening 63 and tab 65 will exert a force through the tab onto the item to hold the item in place.

Constructing the item carrier of a flexible material will also allow an item to be easily removed from the item carrier. Physically bending the item carrier with respect to the item will move tabs 65 out of engagement with the item to release the item. After this procedure is repeated for each snap lock, the item will be completely freed from the item carrier.

Preferably, each item is identified by a unique product code. The product code for each item will uniquely identify each item by the item's depth, length, width, and the dimensions and location of the item's surface area that is available for inscribing. The product code may be displayed on the item carrier and/or contained in a barcode 132 (referring to FIG. 5) affixed to the particular item carrier 60. Preferably the product code and/or barcode is located on the top the item carrier so that the product code and/or barcode are visible when the item carrier is secured to the engraving table.

As illustrated in FIG. 6, engraving table 24 is provided with slots 38 that extend from a position adjacent opening 36 to the outer edges of engraving table 24 to further secure the item carrier in place and to prevent movement/rotation during the engraving process. As illustrated in FIG. 9, the item carrier has two tabs 70. Tabs 70 are positioned at or adjacent the outer edge of item carrier 60 and are aligned with boss 64 so that they will engage slots 38 in engraving table 24. The engagement of tabs 70 with slots 38 ensures that the item carrier and associated item are correctly orientated on engraving table 24 and are not rotated with respect to circular opening 36.

In addition, the engagement of tabs 70 with slots 38 on engraving table 24 prevent item carrier 60 from rotating around circular boss 64 when the item is being engraved. Without tabs 70, the forces exerted by the inscriber on the item may cause the item carrier to rotate around circular opening 36. Thus, the engagement of the tabs with the engraving table at opposing sides of the item carrier provides additional stability to the item during the engraving process.

While the preferred embodiment discloses a single circular boss and two tabs to prevent the item from rotating during the engraving operation, many other shapes and combinations will effectively perform the same function. For example, a boss having a polygonal or elongated shape will also help prevent rotation of the item carrier. Multiple bosses on the item carrier will perform the same function.

The first and second positioning structures of the disclosed embodiment are presently preferred because they allow flexibility in the size and shape of the item carrier. The presence in the engraving table of an opening with two slots requires only that the item carrier have a boss corresponding to the opening and tabs that are aligned to engage the slots. The distance between the boss and tabs is restricted only by the size of the engraving table. Thus, any size or shape of item carrier may be used with this combination. In contrast, combinations of structures using multiple bosses are potentially more limiting in that the distance between the bosses is fixed and each item carrier must be at least as big as the distance between the bosses.

As described previously and as illustrated in FIGS. 13 and 14, third stepper motor 34 (referring to FIG. 4) may be activated to move engraving table 24 to a loading position. In the loading position, engraving table 24 extends through opening 122 in housing 104 to expose the first positioning structure 36. As illustrated in FIG. 13, when the engraving table is in the loading position, item carrier 60 may be secured to the engraving table by engaging the respective positioning structures.

As shown in FIG. 13, a lever 136 is positioned below engraving table 24. Lever 136 is mounted on pivot 135 and moves in the Y-direction with engraving table. One end of lever 136 includes a pad 134. A projection 137 and a switch contact 138 are disposed on the opposite side of pivot 135 from pad 134. Projection 137 is positioned to extend partially into opening 36 in engraving table 24. Preferably, a spring 133 acts on lever 136 to ensure the pad side of the lever is lower than the switch contact side of the lever so that the top of pad 134 is level with the top surface of engraving table 24 and switch contact 138 is out of contact with an indicator switch 139. In an alternative embodiment, the pad side of lever 136 is heavier than the switch contact side of lever 136 so that the pad side of the lever will naturally pivot to a lower point than the switch contact side.

As shown in FIG. 14, when item carrier 60 is secured to engraving table 24, boss 64 contacts projection 137 and causes lever 136 to rotate about pivot 135. The rotating motion of lever 136 moves switch contact 138 into contact with an indicator switch 139 and causes pad 134 to project above the surface of engraving table 24. After the item has been engraved, an operator may press down on pad 134 to rotate lever about pivot 135 and move projection 137 upwardly within opening 36, thereby dislodging item carrier 60 and the associated item from engraving table 24.

The contact between indicator switch 139 and switch contact 138 indicates to 11 the controller that an item is positioned on the engraving table. Preferably, the indicator switch is not activated until boss 64 of item carrier 60 is fully inserted into opening 36 and engaged with spring pins 42. Once indicator switch 139 is activated, the controller would allow third stepper motor 34 to retract engraving table 24 into housing 104.

As illustrated in FIG. 5 and previously described, a barcode 132 may be affixed to item carrier 60. Preferably, barcode 132 contains a product code that identifies the item held in the item carrier. A barcode reader 130 is connected to the system to read the barcode and communicate the product code to the controller. Preferably, barcode reader 130 is not activated until indicator switch 139 indicates that item carrier 60 is secured to engraving table 24. Activating the barcode reader in this manner will reduce the likelihood that an operator will scan a barcode from an item carrier that contains an item different from the item actually secured to the engraving table for engraving.

In accordance with the present invention, a controller is provided to govern the motion of the inscriber. In the preferred embodiment, the controller governs the entire operation of the inscribing system. The controller includes an input device to receive information about the particular item to be inscribed as well as the content of the inscription.

Figure 15:
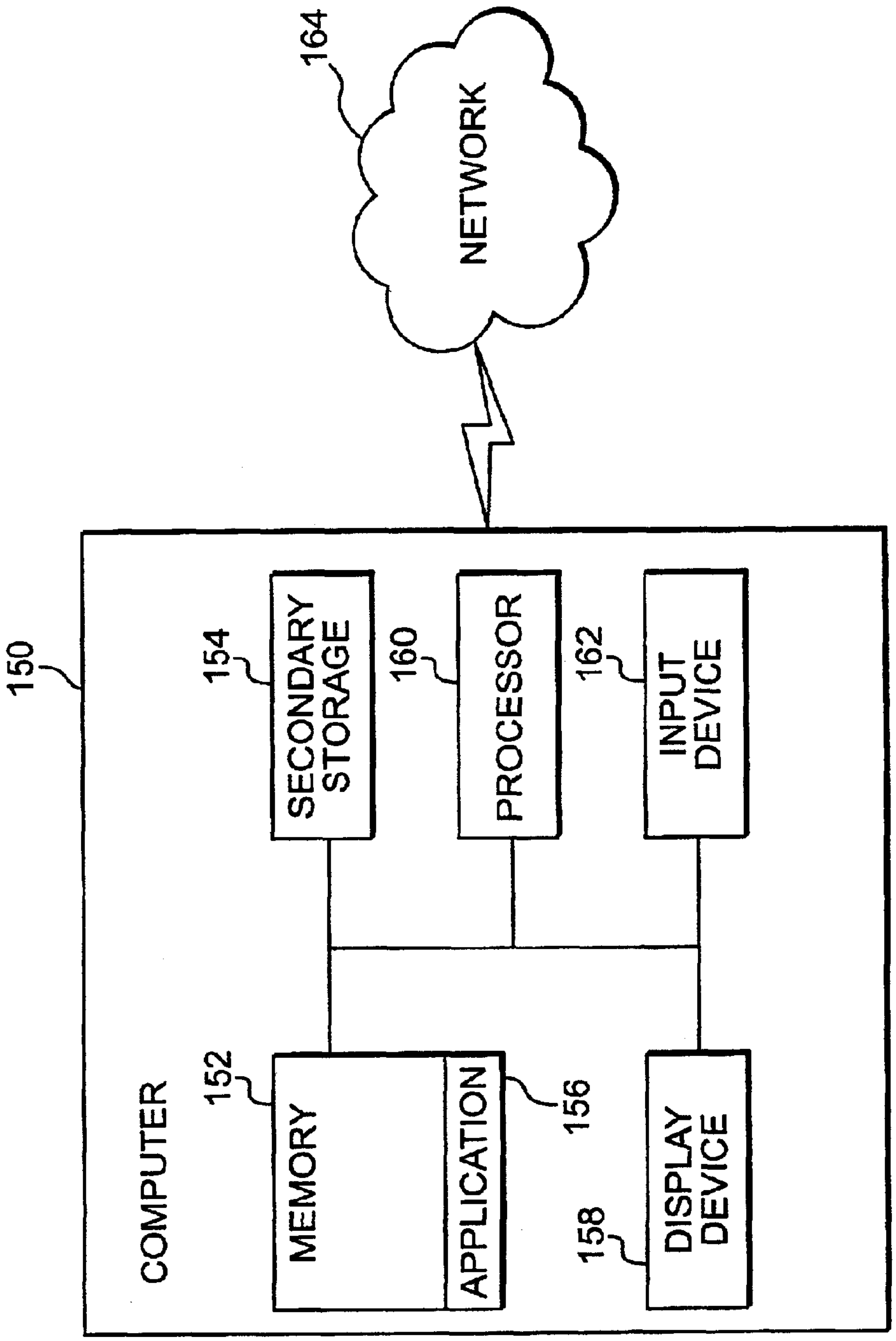
FIG. 15 is a schematic diagram of a computer suitable for controlling the operation of the inscribing system.

Preferably, controller 102 includes a device, such as computer 150 (referring to FIG. 15), to control the operation of the inscribing system. Computer 150 includes a memory 152, a secondary storage device 154, a processor 160 such as a central processing unit, an input device 162, and a display device 158. Memory 152 and secondary storage 154 may store applications, such as application 156, or information for execution and use by processor 160. Computer 150 is optionally connected to a network 164, such as the Internet.

In the preferred embodiment, input device 162 and display device 158 are combined into a single monitor 106 (referring to FIG. 1) having a touch sensitive screen. A user may touch certain areas of the screen in response to prompts from the controller to enter information about the item to be inscribed and the content of the inscription. Additionally, computer 150 may access the Internet, or another electronic source of information, to obtain text or figures to include in the inscription. Input device 162 may also include a barcode scanner 130 (referring to FIG. 5) to receive information about an item to be inscribed from barcode 132 attached to the respective item carrier. In addition, input device 162 may include a scanner so that images or text may be scanned in and inscribed on an item.

Although computer 150 is depicted with various components, one skilled in the art will appreciate that this computer can contain additional or different components. Additionally, although computer 150 is shown connected to network 164, computer 150 may be connected to other networks, including other wide area networks or local area networks. Furthermore, although aspects of the present invention are described as being stored in memory, one skilled in the art will appreciate that these aspects can also be stored on or read from other types of computer program products or computer-readable media, such as secondary storage devices, including hard disks, floppy disks, or CD-ROM; a carrier wave from a network such as the Internet; or other forms of RAM or ROM. These aspects of the present invention may also include modules, implemented in software, hardware, or a combination, configured to perform a particular method implementing an embodiment consistent with the present invention. In addition, the computer-readable media may include instructions for controlling a computer system, such as computer 150, to perform a particular method.

Figure 16:
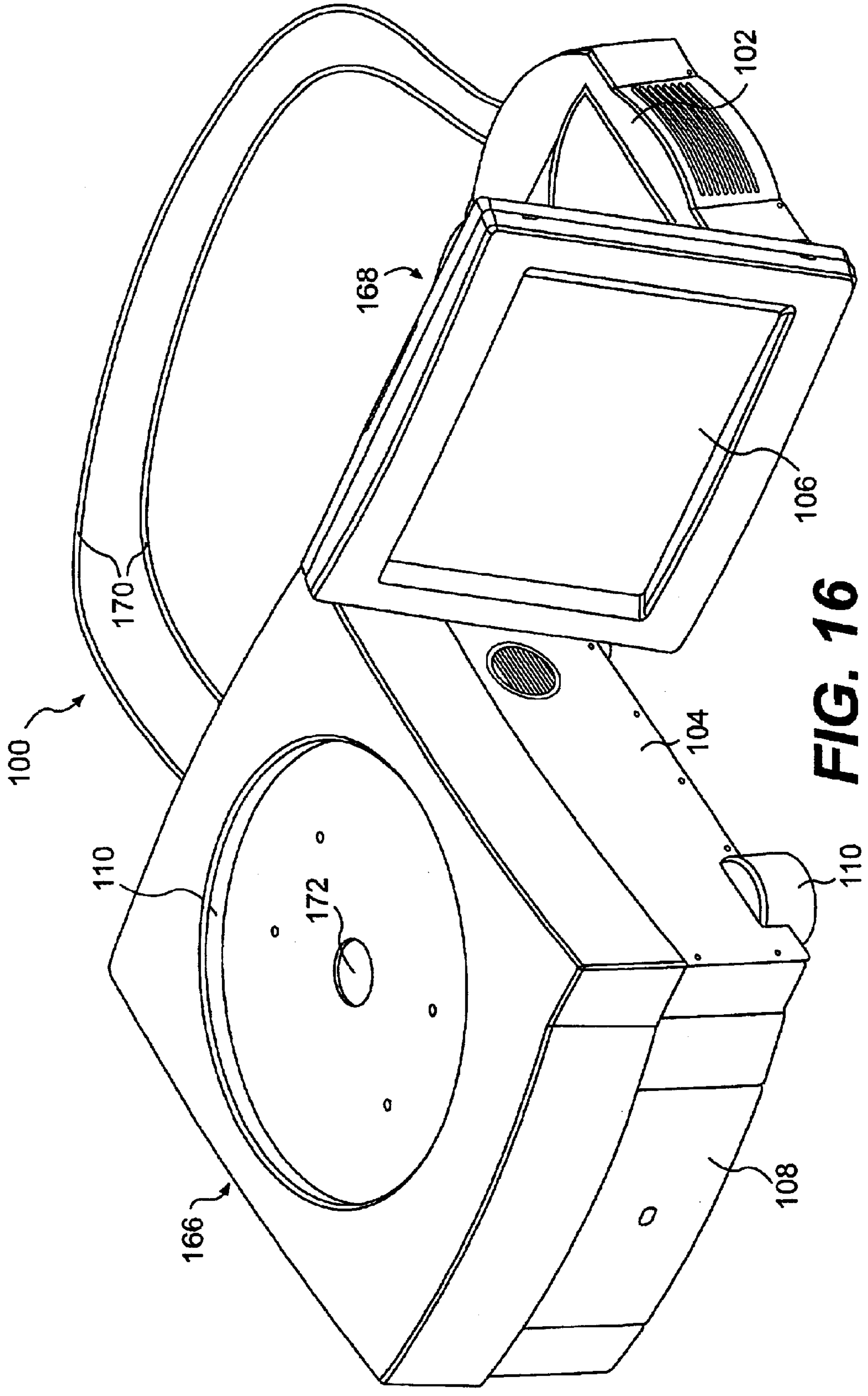
FIG. 16 is a perspective view of an inscribing system according to the present invention, illustrating the control module separated from the inscribing module.

As shown in FIG. 16, inscribing system 100 includes an inscribing module 166 and a control module 168. Inscribing module 166 includes the housing 104 and the enclosed inscribing elements and control module 168 includes controller 102 and input device 106. A connection 170 is provided between engraving module 166 and control module 168 to allow the modules to be physically separated. This feature is particularly beneficial in a small store, where the inscribing module may be located in a storage area, such as in a back room or underneath a counter, while the control module is located in a position such as a store counter where both customers and employees may access the input device to enter information.

Figure 17:
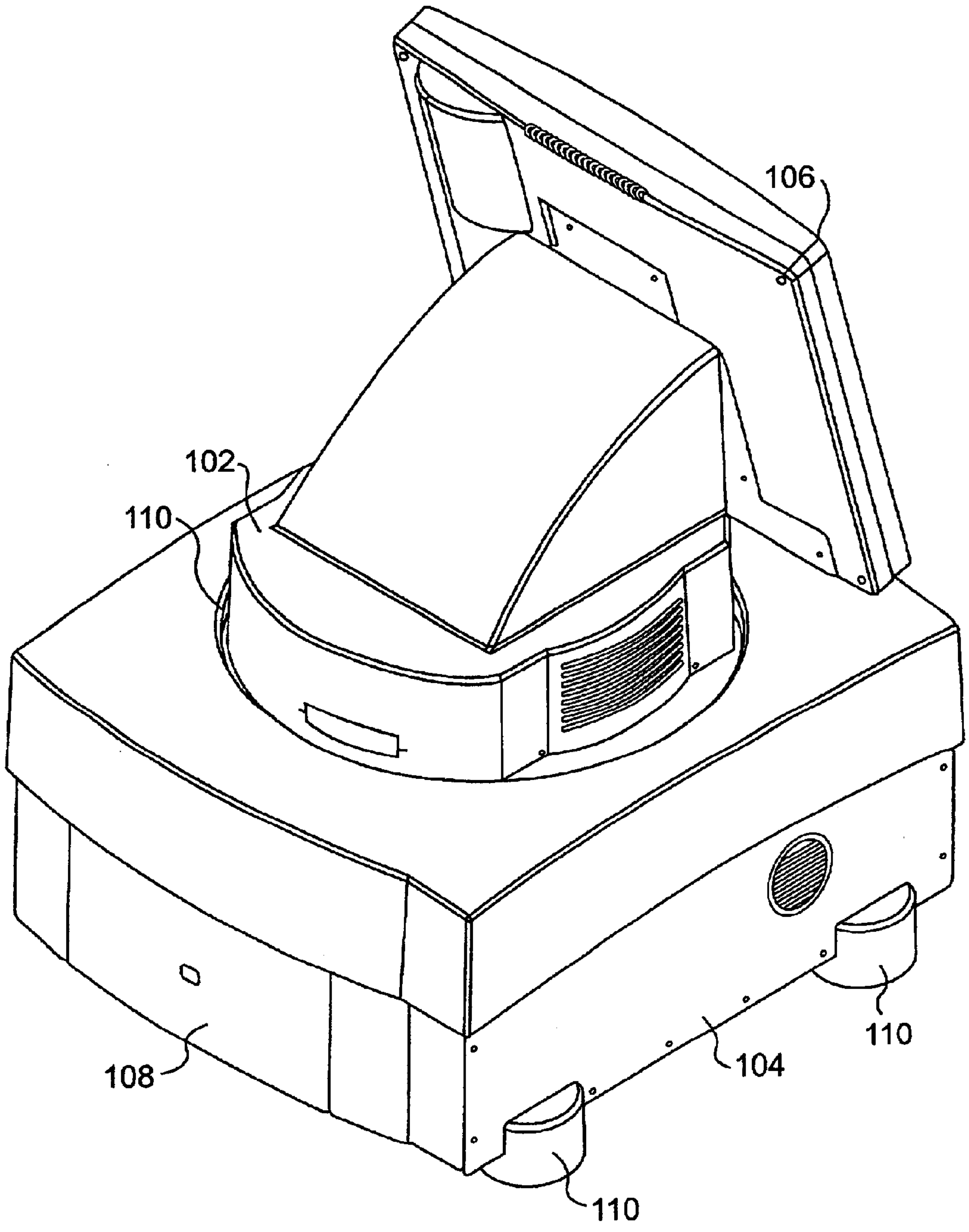
FIG. 17 is a perspective view of an inscribing system according to the present invention, illustrating the input device in a pivoted position.

As illustrated in FIG. 17, controller 102 is preferably rotatably mounted on housing 104. Housing 104 includes a circular recess 110 that receives control module 168. A smaller circular recess is further included in housing 104 that receives a corresponding projection (not shown) on the base of control module 168. Control module 168 pivots within recesses 110 and 170 of housing 104. In this manner, the input screen may be pivoted between a first position, which preferably presents the input device to an operator, and a second position, which preferably presents the input device to a customer. Providing a pivotable input screen allows an operator to set up the inscribing system to inscribe a particular item and then pivot the screen to allow a customer to input the content of the inscription for the item. Thus, the customer may directly input the desired inscription, without having to verbalize the content of the inscription to the operator. This feature will reduce the likelihood of errors in the inscription that result from language barriers between the operator and customer.

Figure 18:
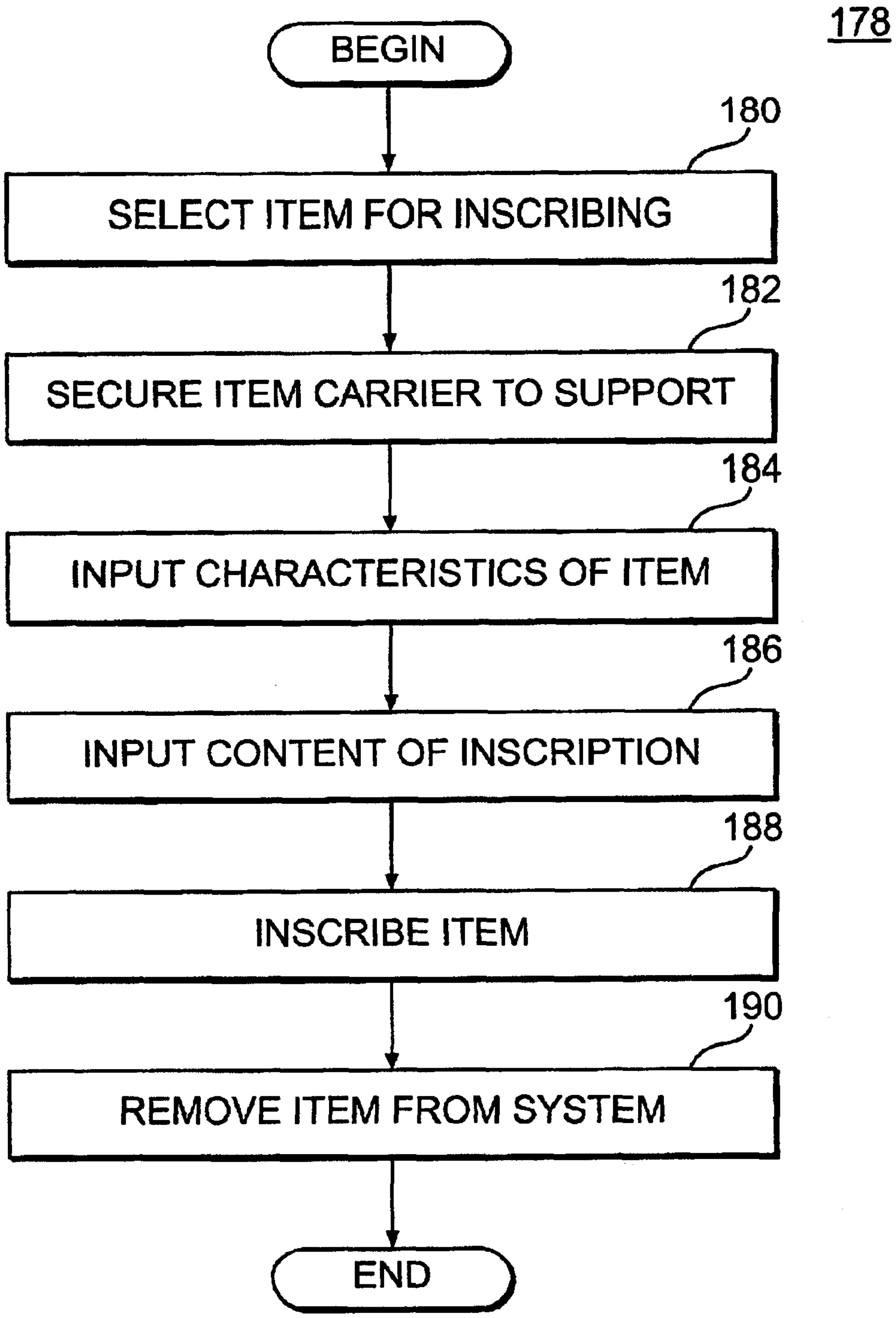
FIG. 18 is a flowchart depicting a method of inscribing an item in accordance with the present invention.

The operation of the engraving system of the present invention will now be described with reference to the accompanying drawings. FIG. 18 is a flow chart of an exemplary process 178 for inscribing an item. Process 178 may be implemented by application 156 (referring to FIG. 15) stored in memory 152 and controlling operation of processor 160.

A customer selects an item for inscribing (step 180). Each item available for inscribing is secured into an item carrier preferably having a relief of substantially the same shape. For example, a rectangular item, such as a name plate, could be secured in the item carrier of FIG. 11*a*. Preferably, the items are already in item carriers, although the items may be displayed and stored separate and apart from the item carrier. In the latter case, the items will be inserted into the item carrier at a preliminary stage of the inscribing process.

Preferably, the particular characteristics of each item, including the item's height (as indicated by line 192 in FIGS. 19*a–c*), the shape and location of the inscribing area available on the item, and any other required information, are stored in memory 152. Memory 152 associates a unique product code with the characteristics of each item. The product code for the item is preferably displayed on the item or item carrier, and/or affixed to the item or item carrier in a barcode.

Figure 12:
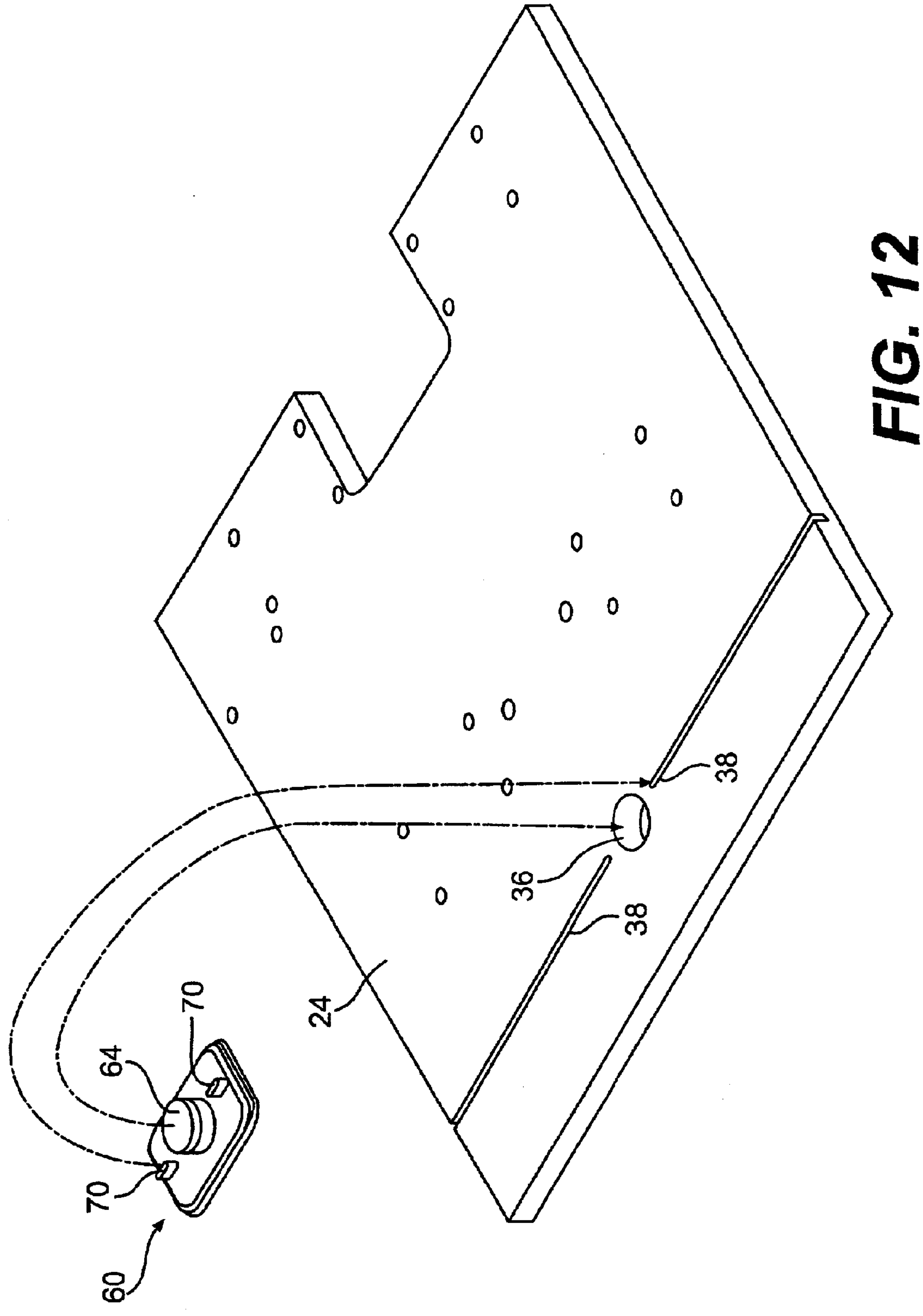
FIG. 12 is a perspective view of the item carrier and support of the present invention, illustrating the engagement of a first positioning structure and a second positioning structure.

After the desired item is selected, the operator fixes the item carrier to the support of the inscribing system (step 182). As illustrated in FIG. 12, the item carrier 60 is positioned on engraving table 24 by engaging boss 64 and tabs 70 of the item carrier with opening 36 and slots 38 of the engraving table. As described above, the engagement of the boss with the circular opening positions the item so that the location of the inscribing area of the item is known to, or may be determined by, controller 102.

Referring to FIGS. 7 and 8, boss 64 has a pair of indentations 72 which engage spring pins 42 when the boss is inserted into opening 36 in engraving table 24. Beveled edge 74 of the boss pushes spring pins 42 outwardly into open area 52. When boss 64 is fully inserted into opening 36, spring pins 42 snap into the indentations 72 to secure the item carrier to the engraving table.

In addition, boss 64 presses down on projection 137 of lever 136 (referring to FIGS. 13 and 14) to rotate lever 136 about pivot 135. Pivoting lever 136 moves switch contact 138 to activate indicator switch 139. This indicates to controller 102 that an item is positioned for inscribing.

The operator or customer then inputs the characteristics of the item into the input device (step 184). This step may be accomplished by manually typing the product code of the item into input device 106. Alternatively, referring to FIG. 5, barcode reader 130, which was activated when indicator switch 139 acknowledged the proper positioning of item carrier 60, may read barcode 132 on item carrier 60 to input the product code. Controller 102 matches the input product code with the product codes stored in memory 152 to identify the particular characteristics of the item to be inscribed. After the characteristics of the item are identified to controller 102, third stepper motor 34 is activated to move engraving table 24 and the secured item into housing 104 and into an inscribing position.

When engraving table 24 is completely within housing 104, door 108 is biased into a shut position to completely enclose the moving elements of the inscribing system. Shutting door 108 activates contact switch 124. For safety reasons, controller 102 preferably will not continue the inscribing operation until door 108 is shut.

The desired content of the inscription is then entered into the input device (step 186). Preferably, once engraving table 24 has moved completely within housing 104 and door 108 has shut, the operator pivots input device 106 to face the customer to allow the customer to enter the content of the inscription. Input device 106 is preferably a touch sensitive screen that allows the user to select the content of the inscription. The content of the inscription may include both text and figures. The text of the inscription may be selected in any font, or a combination of fonts, as well as in another language.

The customer may select figures to be inscribed in the item from any number of figures stored in memory 152. The available figures may be presented to the customer in a series of categories. For example, the customer may select a holiday category and be presented with a series of figures related to various holidays, such as candy canes, Christmas trees, stars, or sleds. Any number of figures may be stored in memory 152 in any series of categories. In addition, a scanner (not shown) may be connected to the system to allow the customer to scan in an image to be inscribed into the item. The system may also be connected to a network, such as the Internet, to allow the customer to download an image or design to be inscribed in the item.

After the content of the inscription is selected, the monitor preferably displays a graphical representation of the item with the selected inscription. The representation is presented as an exact replica of the item with the inscription shown exactly as it will appear on the item. The customer may then opt to go forward with the inscription or may return to modify the content of the inscription. Because the controller knows the dimensions of the surface area available for engraving, the customer will not be allowed to input a message or design that is larger than the available inscribing area for the particular item.

The operator or customer may then start the inscription operation (step 188). Controller 102 then controls the motions of engraver 12 to inscribe the selected inscription into the item. Because the engagement of the first and second positioning structures establishes a reference point and the controller knows the particular characteristics of the item, the controller 12 may determine the location of the inscribing area of the item from the entered product code. Thus, the precise location of the inscribing area may be easily determined.

Figure 19A:
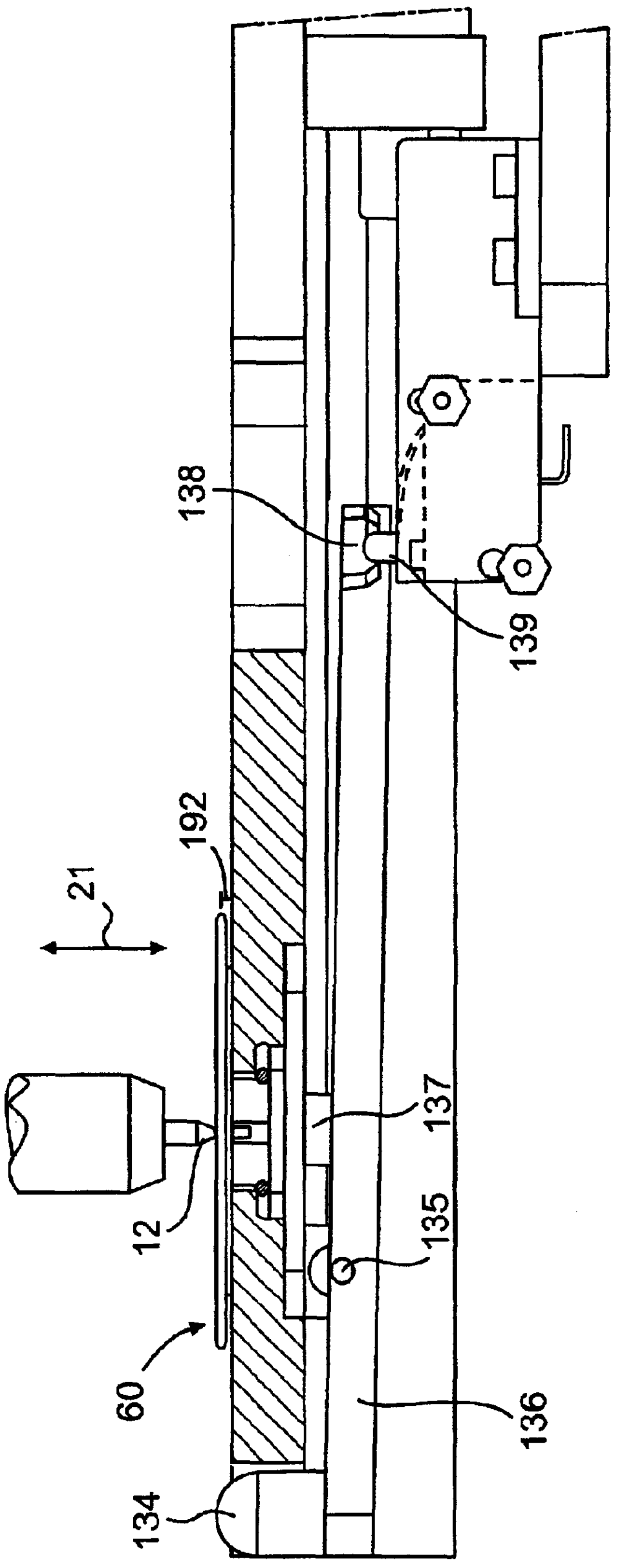
FIGS. 19(*a*)–(*c*) are sectional views of an inscriber according to the present invention, illustrating the inscription of items having three different depths.
Figure 19B:
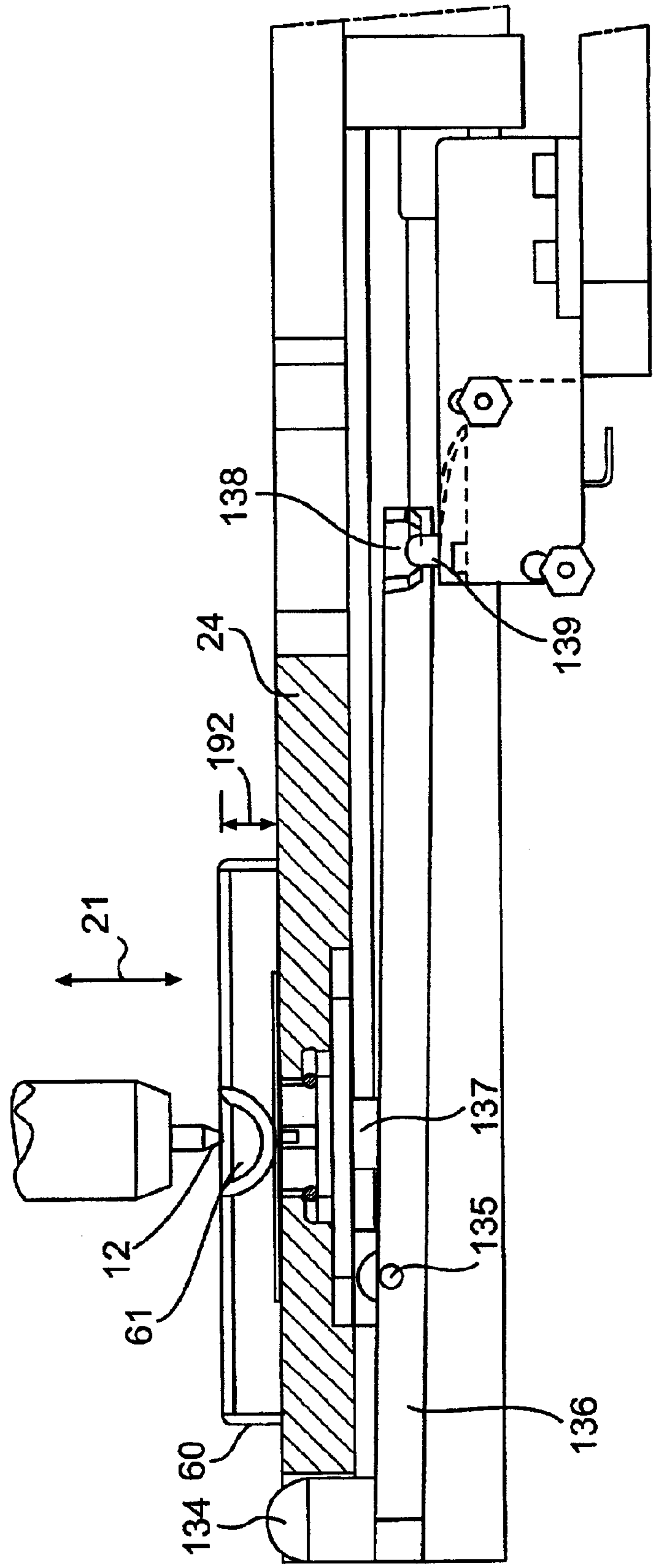
Figure 19C:
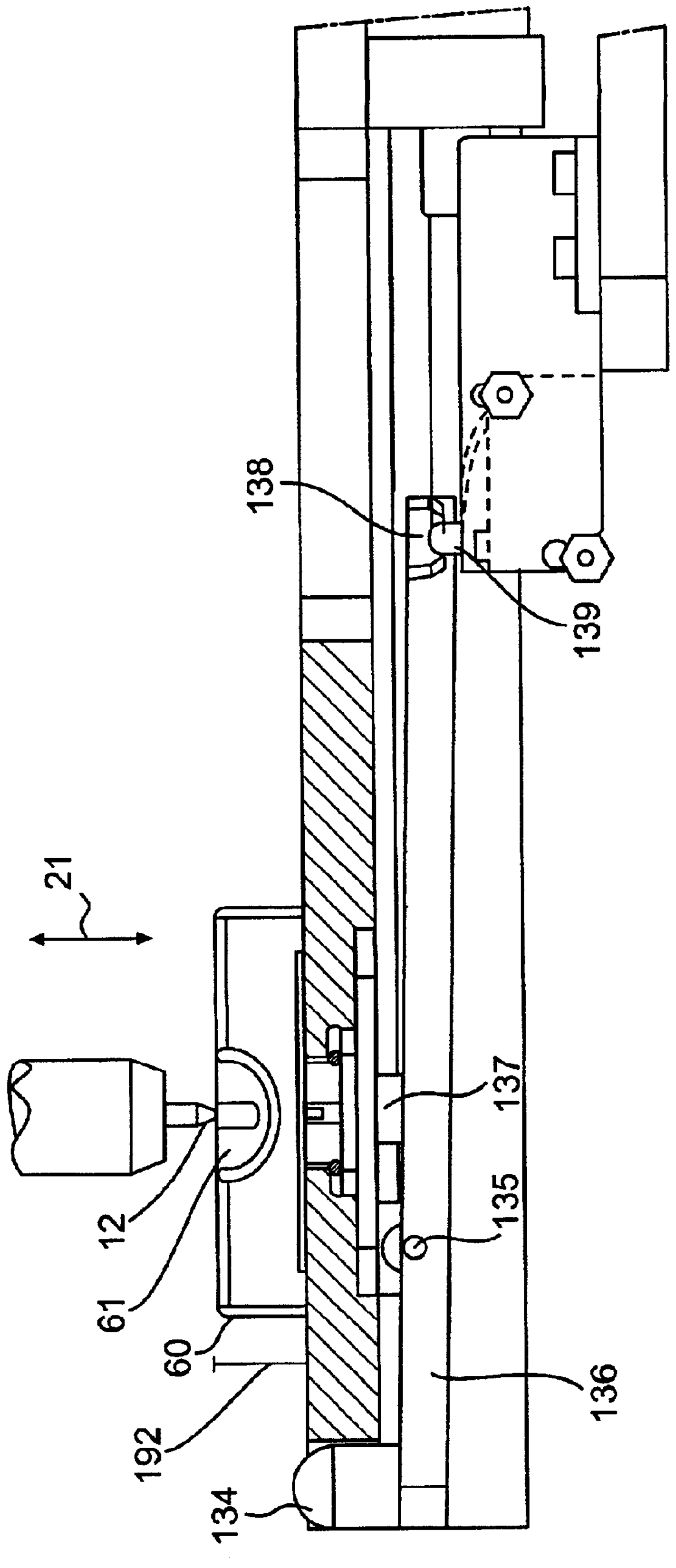

As shown in FIGS. 19*a–c*, items having different heights may be inscribed. Since the height of the item is defined as part of the characteristics of each item, controller 102 activates second stepper motor 18 to move engraver 12 in the Z-direction (as indicated by line 21) to engage the engraver with the surface of item 61. When engraver 12 is engaged with the surface of item 61, controller 102 governs the motions of first and third stepper motors 30 and 34 to control the X- and Y-direction motion of the engraver with respect to the item. In this manner, controller 102 continues to control the inscribing operation until the desired inscription is completed.

Preferably, a spring is positioned between the engraver and the shaft. The contact of the engraver against the surface of the item compresses the spring so that the spring biases the engraver into contact with the surface. If the surface of the item contains any irregularities, the force of the spring will ensure that the engraver maintains contact with the item.

The surface of an item, such as, for example, a pen, may be rounded and have a varying height over the area available for inscribing. Any such contours of an item's surface are stored as part of the characteristics for the particular item. Thus, controller 102 may account for the varying height of the item's surface and move engraver 12 in the Z-direction to ensure that engraver 12 maintains contact with the surface of the item over rounded surfaces. The spring between the engraver and the shaft ensures that the engraver maintains contact with the surface of the item, if the surface contains any irregularities in addition to the expected contours.

Upon completion, controller 102 moves engraver 12 away from item 61 and displays that the operation is complete. When door 108 is opened, contact switch 124 is deactivated. Controller 102 governs third stepper motor 34 to move engraving table 124 back to the loading position to expose the inscribed item.

The operator then removes the item carrier and item from the system (step 190). Referring to FIG. 14, the operator presses down on pad 134 to pivot lever 136 about pivot point 135. Projection 137 exerts an upward force on boss 64 that forces spring pins 42 outwardly. After spring pins 42 are disengaged from boss 64, the continued force of projection 137 moves item carrier 60 with respect to engraving table 24 to dislodge the item carrier. The item carrier and inscribed item can be removed from the system and presented to the customer.

It will be apparent to those skilled in the art that various modifications and variations can be made in the method of the present invention and in construction of this engraving system without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method of engraving a workpiece, comprising:

selecting a workpiece having a predefined shape for engraving;

selecting a workpiece carrier having a surface defining a relief having a closed perimeter that substantially corresponds to the shape of the workpiece, a locking mechanism adapted to secure the workpiece having the predefined shape within the relief, and a first positioning structure;

engaging the first positioning structure of the workpiece carrier with a second positioning structure on an engraving table to thereby position the relief of the workpiece carrier in a predetermined position on the engraving table;

inputting a message to be engraved on the workpiece into a control;

moving the engraving table to a loading position where the engraving table extends through a door mounted on a housing, such that the relief of the workpiece carrier is exposed;

inserting the workpiece having the predefined shape into the relief of the workpiece carrier;

moving the engraving table to an engraving position, where the engraving table is enclosed by the housing; and controlling the motion of an engraver enclosed in the housing to thereby engrave the inputted message on the workpiece.

2. The method of claim 1, further including moving the engraving table to the loading position to allow the engraved workpiece to be removed from the workpiece carrier.

3. The method of claim 1, wherein one of the first and second positioning structures includes a projection and the other of the first and second positioning structures includes an opening.

4. The method of claim 1, further including:

disengaging the first positioning structure of the workpiece carrier from the second positioning structure of the engraving table; and engaging a second workpiece carrier having the first positioning structure with the second positioning structure of the engraving table, the second workpiece carrier having a surface defining a relief that substantially corresponds to the shape of a second workpiece having a shape different than said first workpiece.

5. The method of claim 1, wherein the locking mechanism includes at least one snap lock.

6. An engraving system, comprising:

a housing having a door moveable between an open position and a closed position;

at least one spring acting on the door to move the door towards the closed position;

a pair of support rails disposed in the housing;

an engraving table having a first positioning structure and being slidably disposed on the pair of support rails for movement in a first direction between a loading position where the engraving table extends through the door of the housing and an engraving position where the engraving table is enclosed by the housing;

a workpiece carrier including a surface defining a relief that has a shape substantially similar to the shape of a workpiece to be engraved, a locking mechanism adapted to lock the workpiece within the relief, and a second positioning structure engageable with the first positioning structure to place the relief in a predetermined position with respect to the engraving table;

a first stepper motor operatively connected with the engraving table and operable to move the engraving table along the support rails in the first direction;

an engraver mounted on a support structure for movement in a second direction and a third direction;

a second stepper motor operatively engaged with the engraver and operable to move the engraver in the second direction;

a third stepper motor operatively engaged with the engraver and operable to move the engraver in the third direction; and a control having an input device and operable to control the first, second, and third stepper motors to engrave a message on the workpiece.

7. The system of claim 6, wherein one of the first and second positioning structures includes a projection and the other of the first and second positioning structures includes an opening configured to receive the projection.

8. The system of claim 6, wherein the locking mechanism includes at least one snap lock.

9. The system of claim 6, further including a first lead screw operatively connecting the first stepper motor with the engraving table and a second lead screw operatively connecting the second stepper motor with the engraver.

10. The system of claims 9, further including an engraver housing mounting the engraver and being slidably disposed on a guide rail.

11. The system of claim 10, wherein the second lead screw operatively connects the second stepper motor with the engraver housing and the third stepper motor is disposed on the engraver housing.

12. The system of claim 6, wherein movement of the engraving table between the engraving position and the loading position causes the engraving table to engage the door to thereby move the door to the open position.

13. The system of claim 12, where in movement of the engraving table from the loading position to the engraving position allows the at least one spring to move the door to the closed position.

14. The system of claim 6, further including a second workpiece carrier including the second positioning structure and a surface defining a relief that substantially corresponds to the shape of a second workpiece having a shape different than said first workpiece.

15. The system of claim 14, wherein engagement of the second positioning structure of the second workpiece carrier with the first positioning structure of the engraving table places the center of the relief of the second workpiece carrier in a predetermined position with respect to the engraving table.

16. An engraving system, comprising:

a housing;

an engraving table movable between a loading location wherein at least a portion of the engraving table extends outside the housing and an engraving location wherein at least a portion of the engraving table is disposed inside the housing and having a first positioning structure;

a first workpiece carrier for positioning a first configuration of workpiece with respect to the engraving table, the first workpiece carrier including a first surface defining a relief having a shape that substantially corresponds to the first configuration of workpiece and a locking mechanism adapted to hold the workpiece within the relief, the first workpiece carrier further including a second surface defining a second positioning structure, wherein engagement of the second positioning structure of the first workpiece carrier with the first positioning structure of the engraving table secures the first workpiece carrier to the engraving table and places the first configuration of workpiece in a predetermined engraving position;

a second workpiece carrier for positioning a second configuration of workpiece with respect to the engraving table, the second workpiece carrier including a first surface defining a relief having a shape that substantially corresponds to the second configuration of workpiece and a locking mechanism adapted to hold the workpiece of the second configuration within the relief of the second workpiece carrier, the second workpiece carrier further including a second surface defining the second positioning structure, wherein engagement of the second positioning structure of the second workpiece carrier with the first positioning structure of the engraving table secures the second workpiece carrier to the engraving table and places the second configuration of workpiece in a predetermined engraving position; and a scribe engraver mounted on a support structure such that the scribe engraver is operable to engrave the workpiece positioned on the support table.

17. The system of claim 16, where one of the first and second positioning structures includes at least one projection and the other of the first and second positioning structures includes at least one opening adapted to receive the at least one projection.

18. The system of claim 16, wherein each locking mechanism includes at least one snap lock.

19. The system of claim 16, wherein engagement of the second positioning structure of the first workpiece carrier with the first positioning structure of the engraving table places the center of the relief of the first workpiece carrier in a predetermined position with respect to the engraving table.

20. The system of claim 16, wherein engagement of the second positioning structure of the first workpiece carrier with the first positioning structure of the engraving table substantially aligns the center of the relief of the first workpiece carrier with the center of the first positioning structure of the engraving table.

* * * * *

UNITED STATES PATENT AND TRADEMARK OFFICE

CERTIFICATE OF CORRECTION

PATENT NO. : 6,817,814 B2
DATED : November 16, 2004
INVENTOR(S) : Michael A. Mueller It is certified that error appears in the above-identified patent and that said Letters Patent is hereby corrected as shown below:

Column 15,
Line 39, "claims" should read -- claim --.
Line 50, "where in" should read -- wherein --.

Signed and Sealed this

Fifteenth Day of February, 2005

JON W. DUDAS
*Director of the United States Patent and Trademark Office*